(12) United States Patent
Suzuki

(10) Patent No.: US 8,401,694 B2
(45) Date of Patent: Mar. 19, 2013

(54) MANAGEMENT APPARATUS AND MANAGEMENT METHOD

(75) Inventor: Noriyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 7 days.

(21) Appl. No.: 13/069,689

(22) Filed: Mar. 23, 2011

(65) Prior Publication Data

US 2011/0245960 A1 Oct. 6, 2011

(30) Foreign Application Priority Data

Apr. 6, 2010 (JP) ................................. 2010-087551

(51) Int. Cl.
*G06F 7/00* (2006.01)

(52) U.S. Cl. ......... 700/218; 318/566; 360/92.1; 360/88; 414/331.05

(58) Field of Classification Search ................... 700/218
See application file for complete search history.

(56) References Cited

U.S. PATENT DOCUMENTS

| | | | |
|---|---|---|---|
| 5,498,116 A * | 3/1996 | Woodruff et al. | 414/331.05 |
| 5,537,268 A | 7/1996 | Felde et al. | |
| 5,607,275 A * | 3/1997 | Woodruff et al. | 414/331.05 |
| 5,715,113 A * | 2/1998 | Akiyama | 360/92.1 |
| 6,184,643 B1 * | 2/2001 | Akiyama et al. | 318/566 |
| 6,772,046 B1 * | 8/2004 | Lee et al. | 700/214 |
| 2001/0035859 A1 * | 11/2001 | Kiser et al. | 345/173 |
| 2008/0037160 A1 * | 2/2008 | McIntosh et al. | 360/88 |
| 2008/0273261 A1 * | 11/2008 | McIntosh et al. | 360/92.1 |

FOREIGN PATENT DOCUMENTS

| | | |
|---|---|---|
| JP | 8-263907 A | 10/1996 |
| JP | 2001-225917 A | 8/2001 |

* cited by examiner

*Primary Examiner* — Gene Crawford
*Assistant Examiner* — Kyle Logan
(74) *Attorney, Agent, or Firm* — Fujitsu Patent Center

(57) ABSTRACT

A management apparatus is for managing a storage medium. The apparatus includes a rack including a cell which has a first opening and a second opening, a robot for inserting or ejecting the storage medium with respect to the cell through the first opening, and a controller for executing a process. The process includes driving the robot to start inserting or ejecting the storage medium with respect to the cell, detecting a failure in inserting or ejecting the storage medium, stopping the robot from inserting or ejecting the storage medium for a given time upon detecting the failure, and driving the robot to restart inserting or ejecting the storage medium with respect to the cell after the stopping the robot from inserting or ejecting the storage medium for the given time.

7 Claims, 18 Drawing Sheets

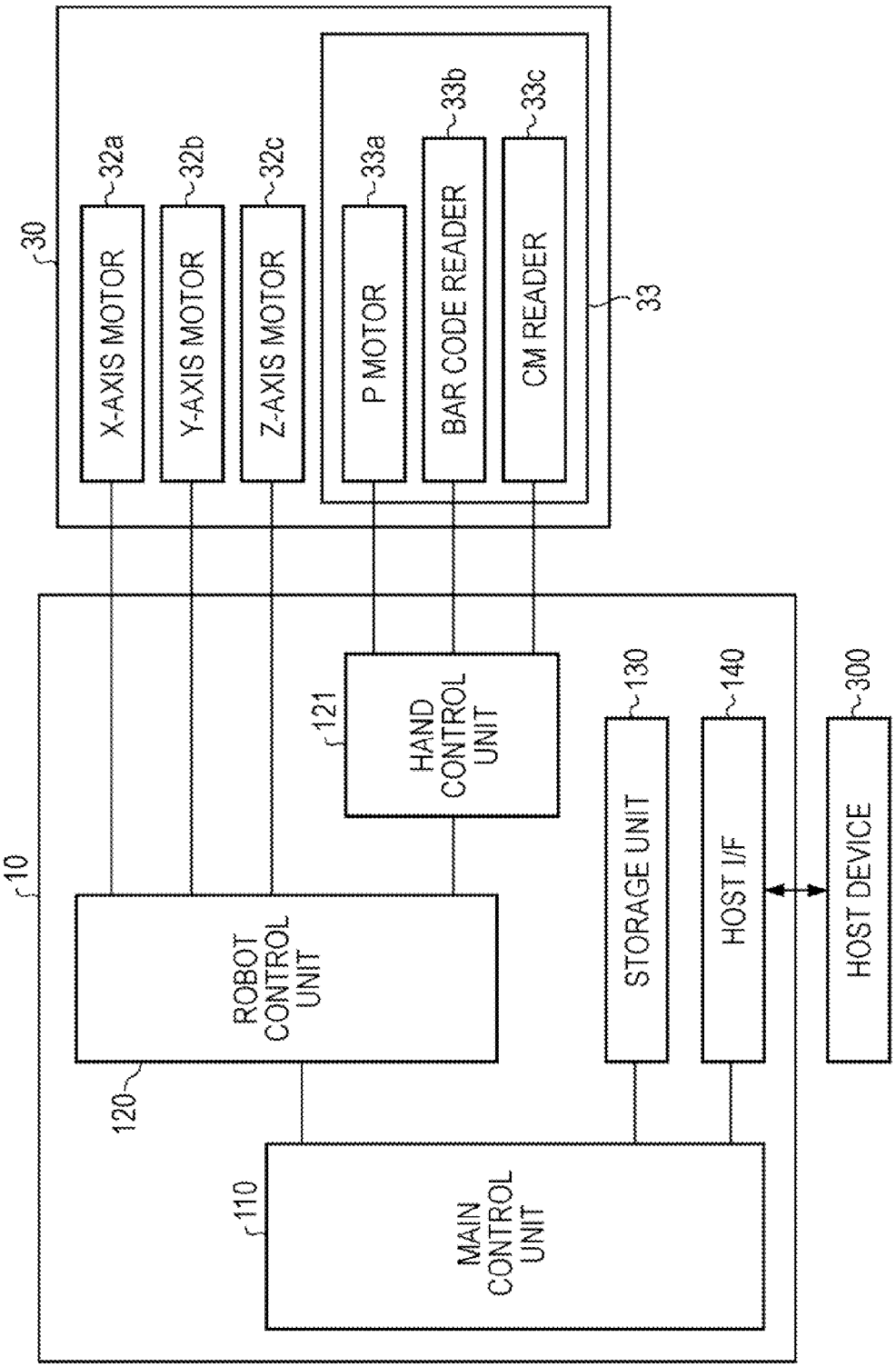

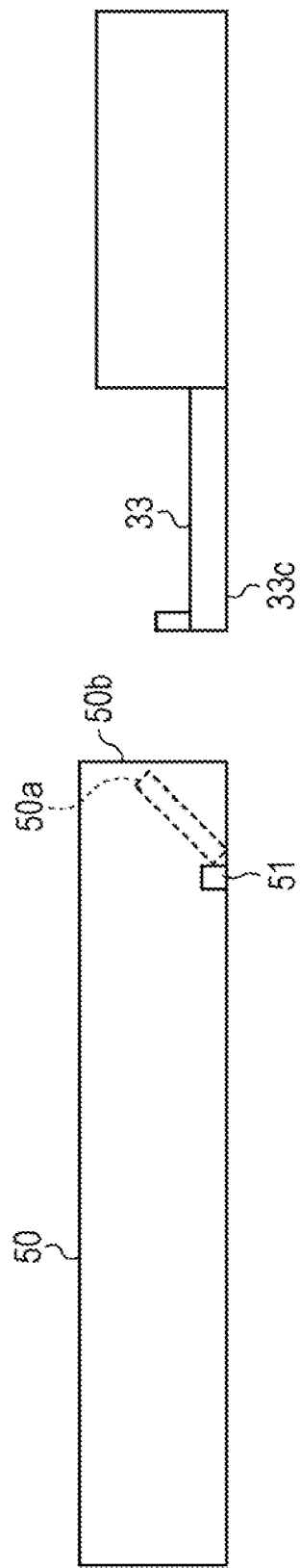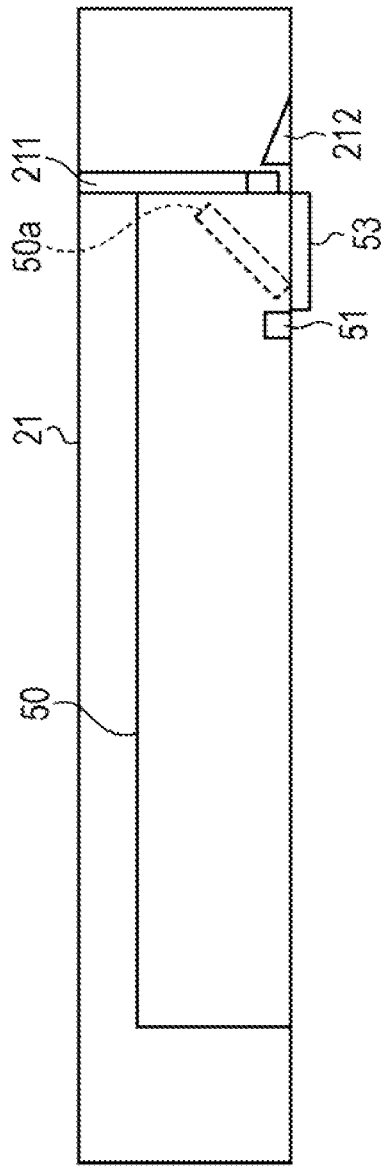

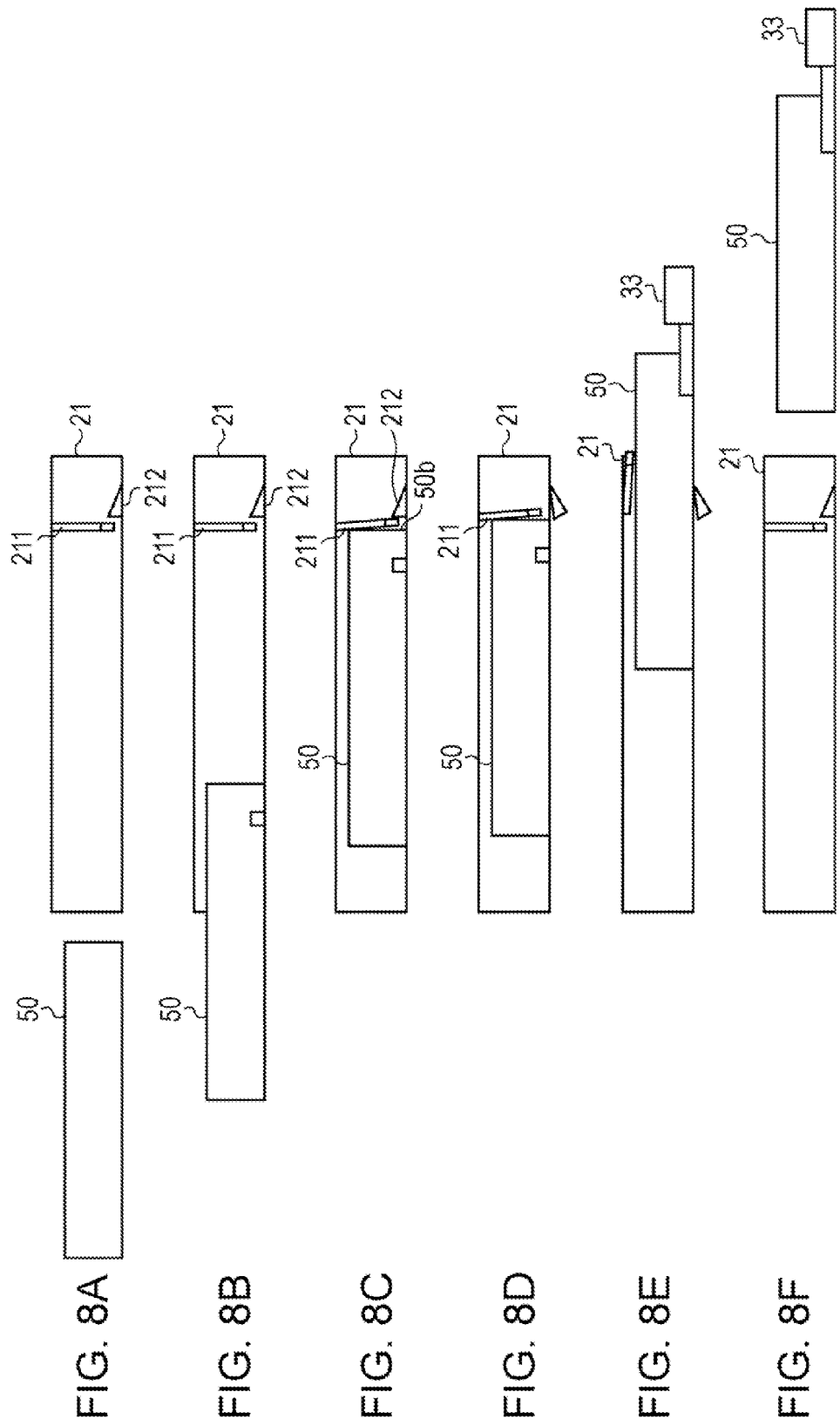

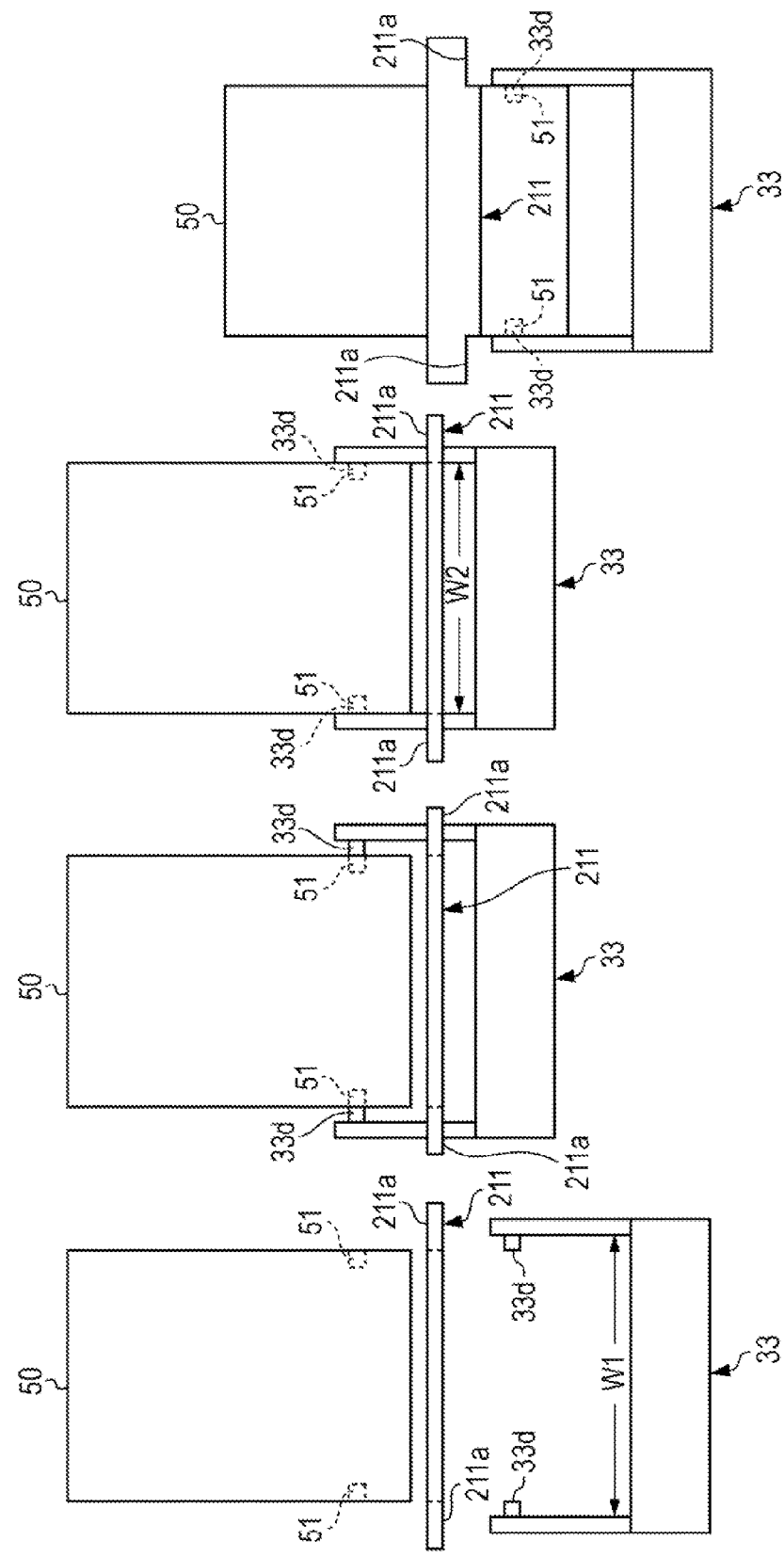

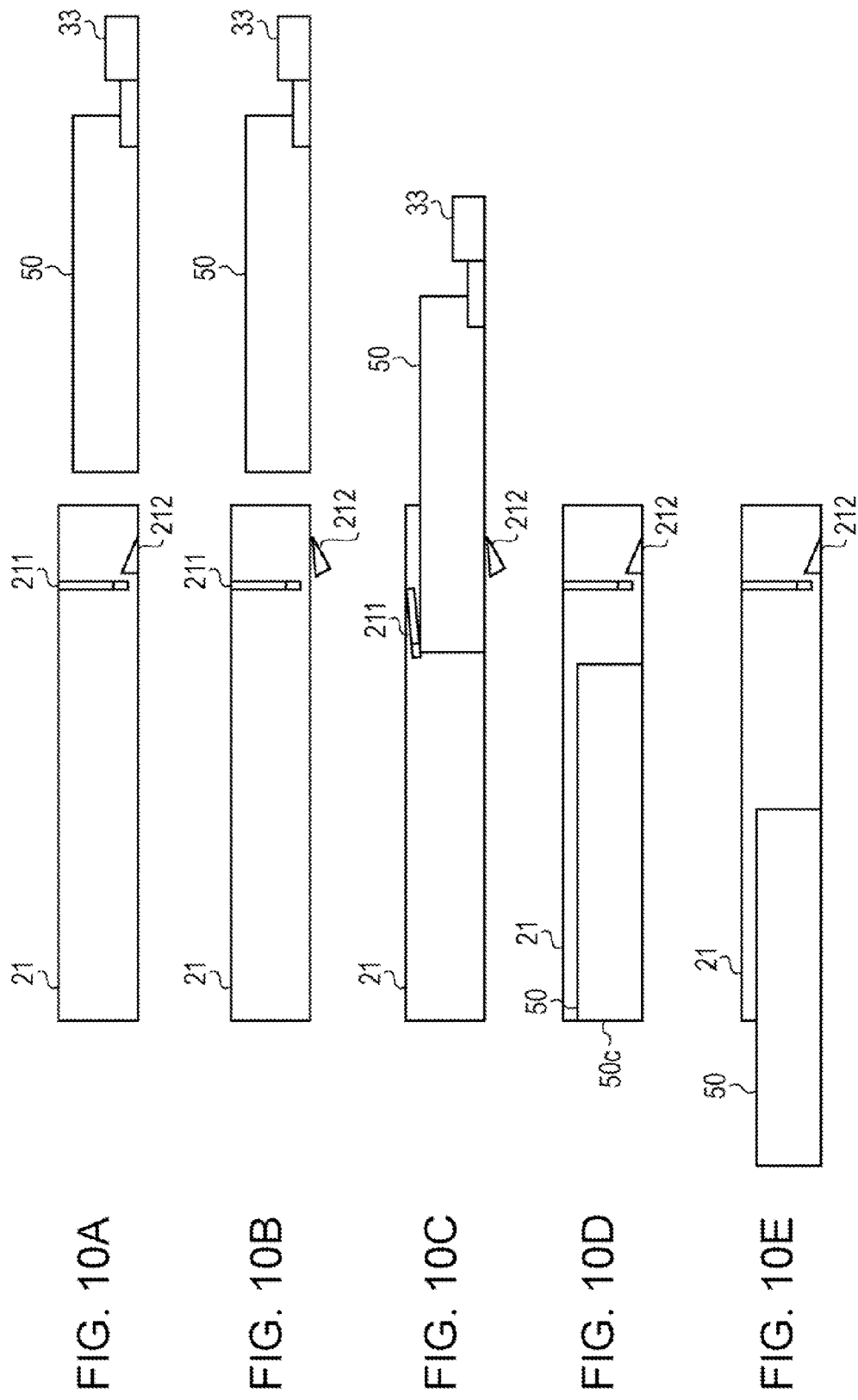

| STATES OF ACCESS TO CELL | FIRST MODE | | SECOND MODE | |
| --- | --- | --- | --- | --- |
| | FRONT DOOR | REAR DOOR | FRONT DOOR | REAR DOOR |
| BEFORE INSERTION OF CARTRIDGE | UNLOCKED | LOCKED | UNLOCKED | LOCKED |
| AFTER INSERTION OF CARTRIDGE | UNLOCKED | LOCKED | LOCKED | UNLOCKED |
| ACCESS TO CARTRIDGE FROM ROBOT | LOCKED | UNLOCKED | LOCKED | UNLOCKED |
| AFTER BRINGING-BACK OF CARTRIDGE TO CELL USING ROBOT | UNLOCKED | LOCKED | LOCKED | UNLOCKED |

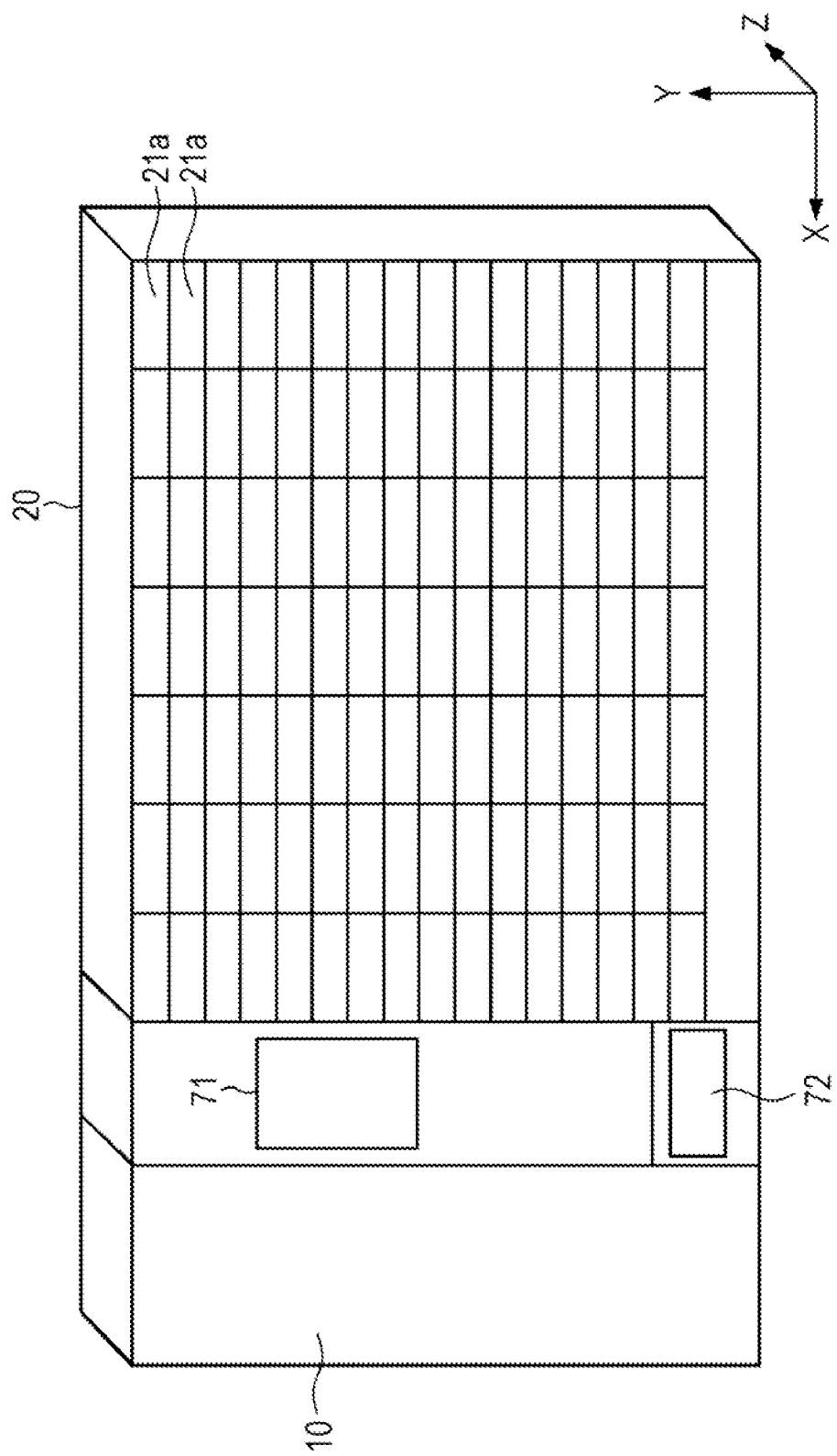

MANAGEMENT APPARATUS AND MANAGEMENT METHOD

CROSS-REFERENCE TO RELATED APPLICATION

This application is based upon and claims the benefit of priority of the prior Japanese Patent Application No. 2010-087551, filed on Apr. 6, 2010, the entire contents of which are incorporated herein by reference.

FIELD

The embodiments discussed herein are related to a management apparatus and a management method.

BACKGROUND

A management system that manages cartridges as storage media is proposed.

As a management system, a system of the type including an access (take-in/take out) port through which an arbitrary cartridge is put into and ejected from a rack, the rack in which the cartridges are contained, an access (take-in/take-out) device that puts an arbitrary cartridge into the rack and ejects an arbitrary cartridge from the rack on the basis of an instruction, and a control device that controls the operation of the access device is proposed. In addition, a management device that retains information on a rack in which cartridges are contained is proposed.

In a management system as mentioned above, in taking a desired cartridge out of a rack, a user inputs the identification information of the desired cartridge into a management device, and a library management device refers to information on the storage position of the desired cartridge on the basis of the input identification information to acquire information on the storage position of the cartridge and sends the acquired information to an access device.

Then, the access device moves around in the rack, takes out the cartridge which is at the storage position concerned, and carries the cartridge to an access port. Then the user accepts the cartridge so carried through the access port.

Japanese Laid-open Patent Publication No. 2001-225917 is an example of the above mentioned system.

In addition to the above mentioned system configured to take in/out the desired cartridge using the access device, a mechanism that takes in and takes out an arbitrary cartridge by hand is also proposed. A mechanism as mentioned above may have such a drawback that management of cartridges is complicated.

SUMMARY

According to an aspect of the invention, a management apparatus for managing a storage medium, the apparatus includes a rack including a cell which has a first opening and a second opening, a robot for inserting or ejecting the storage medium with respect to the cell through the first opening, and a controller for executing a process including driving the robot to start inserting or ejecting the storage medium with respect to the cell, detecting a failure in inserting or ejecting the storage medium, stopping the robot from inserting or ejecting the storage medium for a given time upon detecting the failure, and driving the robot to restart inserting or ejecting the storage medium with respect to the cell after the stopping the robot from inserting or ejecting the storage medium for the given time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a block diagram illustrating an example of functions of a library management device;

FIG. 7A is a diagram illustrating one example of a manner of reading data stored in a CM (Cartridge Memory);

FIG. 7B is a diagram illustrating another example of the manner of reading data stored in the CM;

FIG. 8A is a diagram illustrating one example of a manner of inserting an arbitrary cartridge into an arbitrary cell;

FIG. 8B is a diagram illustrating another example of the manner of inserting an arbitrary cartridge into an arbitrary cell;

FIG. 8C is a diagram illustrating a further example of the manner of inserting an arbitrary cartridge into an arbitrary cell;

FIG. 8D is a diagram illustrating one example of a manner of taking an arbitrary cartridge out of an arbitrary cell;

FIG. 8E is a diagram illustrating another example of the manner of taking an arbitrary cartridge out of an arbitrary cell;

FIG. 8F is a diagram illustrating a further example of the manner of taking an arbitrary cartridge out of an arbitrary cell;

FIG. 9A is a diagram illustrating one example of a method of drawing out an arbitrary cartridge using a robot;

FIG. 9B is a diagram illustrating another example of the method of drawing out an arbitrary cartridge using the robot;

FIG. 9C is a diagram illustrating a further example of the method of drawing out an arbitrary cartridge using the robot;

FIG. 9D is a diagram illustrating a still further example of the method of drawing out an arbitrary cartridge using the robot;

FIG. 10A is a diagram illustrating one example of a manner of inserting an arbitrary cartridge into an arbitrary cell using a robot;

FIG. 10B is a diagram illustrating another example of the manner of inserting an arbitrary cartridge into an arbitrary cell using the robot;

FIG. 10C is a diagram illustrating a further example of the manner of inserting an arbitrary cartridge into an arbitrary cell using the robot;

FIG. 10D is a diagram illustrating a still further example of the manner of inserting an arbitrary cartridge into an arbitrary cell using the robot;

FIG. 10E is a diagram illustrating one example of a manner of taking an arbitrary cartridge out of an arbitrary cell by a user;

FIG. 15 is a diagram illustrating an example of a manner of controlling doors;

FIG. 16 is a diagram illustrating an example of a library system according to a fourth embodiment;

DESCRIPTION OF EMBODIMENTS

Next, a plurality of embodiments will be described with reference to the accompanying drawings.

First, a control device according to an embodiment will be described and then the embodiment will be more specifically described.

<First Embodiment>

Figure 1:
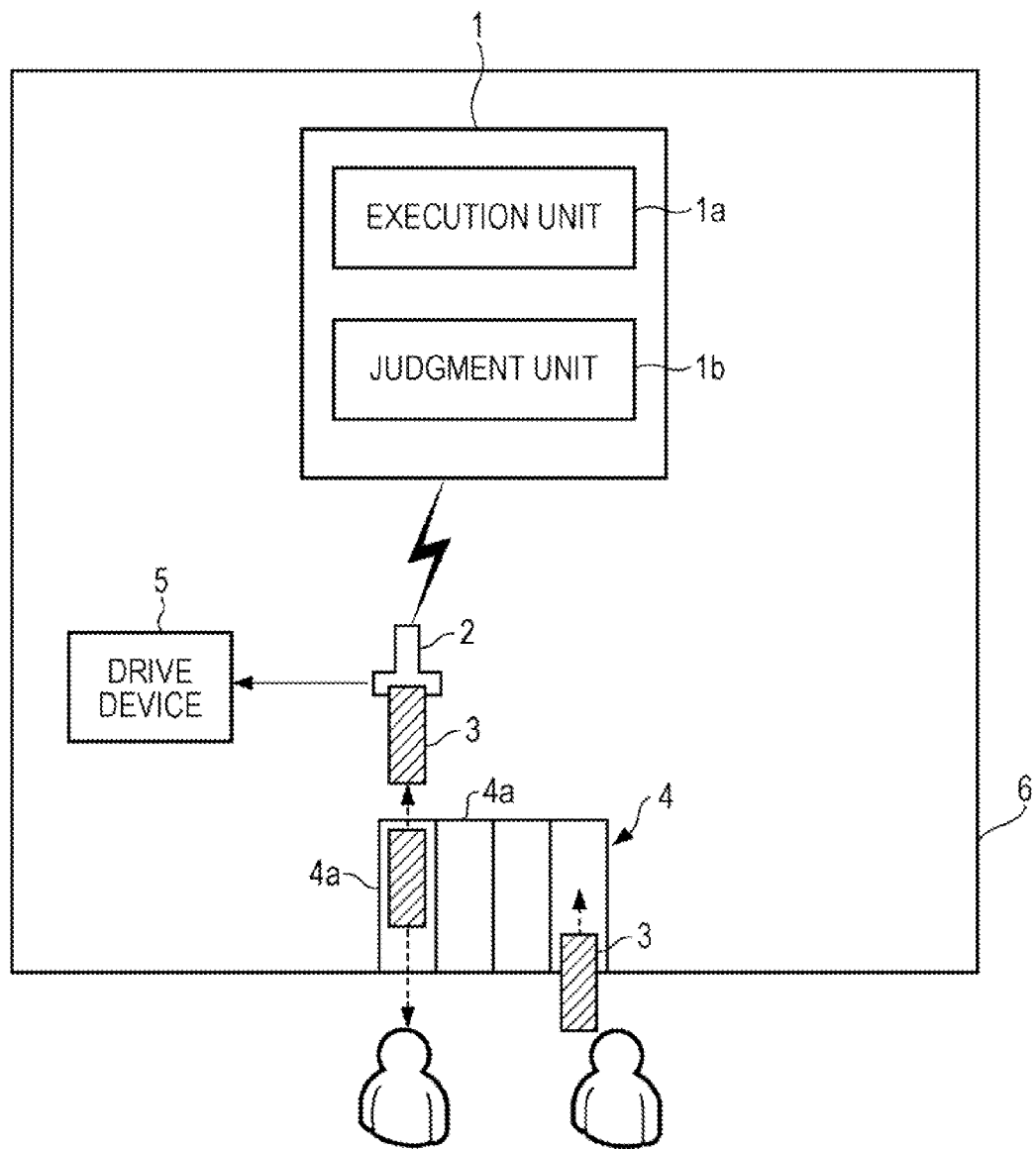
FIG. 1 is a diagram illustrating an example of a general configuration of a control device according to a first embodiment.

FIG. 1 is a diagram illustrating an example of a general configuration of a control device according to a first embodiment.

A control device (a computer) 1 according to the first embodiment controls the operation of a mount mechanism 2.

The mount mechanism 2 takes an arbitrary storage medium 3 out of a containing unit 4 that includes a plurality of cells 4a in which the respective storage media 3 are contained and mounts the storage medium 3 so taken-out onto a drive device 5.

In the example illustrated in FIG. 1, the control device 1, the mount mechanism 2, the containing unit 4 and the drive device 5 are housed in one case 6.

As an example of the storage medium 3, for example, a magnetic tape or the like may be given.

Each cell 4a has openings on the inner and outer sides of the case 6 and has different access surfaces. A user is allowed to take out an arbitrary storage medium 3 contained in an arbitrary cell 4a and to put an arbitrary storage medium 3 into an arbitrary cell 4a through the outer side opening. Likewise, the mount mechanism 2 is allowed to take out an arbitrary storage medium 3 contained in an arbitrary cell 4a and to put an arbitrary storage medium 3 into an arbitrary cell 4a through the inner side opening under the control of the control device 1.

The control device 1 includes an execution unit 1a and a judgment unit 1b.

The execution unit 1a makes the mount mechanism 2 execute a process of taking an arbitrary storage medium 3 out of an arbitrary cell 4a and a process of putting an arbitrary storage medium 3 into an arbitrary cell 4a in execution of a mounting process of mounting an arbitrary storage medium 3 onto the drive device 5.

The judgment unit 1b judges whether conflict has occurred in access to storage media 3 contained in cells 4a while the mounting process is being executed.

As a first example of the conflict in access to storage media 3 contained in cells 4a, for example, conflict which would occur in the case that when the mount mechanism 2 tries to take an arbitrary storage medium 3 out of an arbitrary cell 4a, a user also tries to take that storage medium 3 out of that cell 4a simultaneously may be given. As a second example of the conflict in access to storage media 3 contained in cells 4a, for example, conflict which would occur in the case that when the mount mechanism 2 tries to put one storage medium 3 into an arbitrary cell 4a, the user also tries to put another storage medium 3 into that cell 4a simultaneously may be given.

In the case that the execution unit 1a has judged that the conflict in access to storage media 3 has occurred, the execution unit 1a keeps the mount mechanism 2 from executing the mounting process for a predetermined time period. For example, in the case that the conflict which has been described as the first example of the conflict has occurred in taking out an arbitrary storage medium 3, the execution unit 1a keeps the mount mechanism 2 from executing the process of taking out an arbitrary storage medium 3. In the case that the conflict which has been described as the second example of the conflict has occurred in putting an arbitrary storage medium 3 into an arbitrary cell 4a, the execution unit 1a keeps the mount mechanism 2 from executing the process of putting an arbitrary storage medium 3 into that cell 4a. By keeping the mount mechanism 2 from executing the process in the above mentioned manner, the execution unit 1a gives priority to the user in execution of the process.

Then, after the mount mechanism 2 has been kept from executing the process for the predetermined time period, the judgment unit 1b again judges whether the conflict in access to storage media 3 is occurring. In the case that the conflict in access to storage media 3 is occurring, the judgment unit 1b informs, for example, a host (a high-order) device that manages the control device 1 of occurrence of an error.

On the other hand, in the case that the conflict in access to storage media 3 does not occur, the mount mechanism 2 executes a desired operation in accordance with an instruction from the execution unit 1a.

Owing to the above mentioned operations, the conflict which would occur between the user and the mount mechanism 2 may be avoided and hence the operability of the user may be increased.

Incidentally, the execution unit 1a and the control unit 1b may be implemented by functions that a CPU (Central Processing Unit) included in the control device 1 has.

Next, the control device according to the embodiment will be more specifically described by giving a library system including a library management device as an example.

<Second Embodiment>

Figure 2:
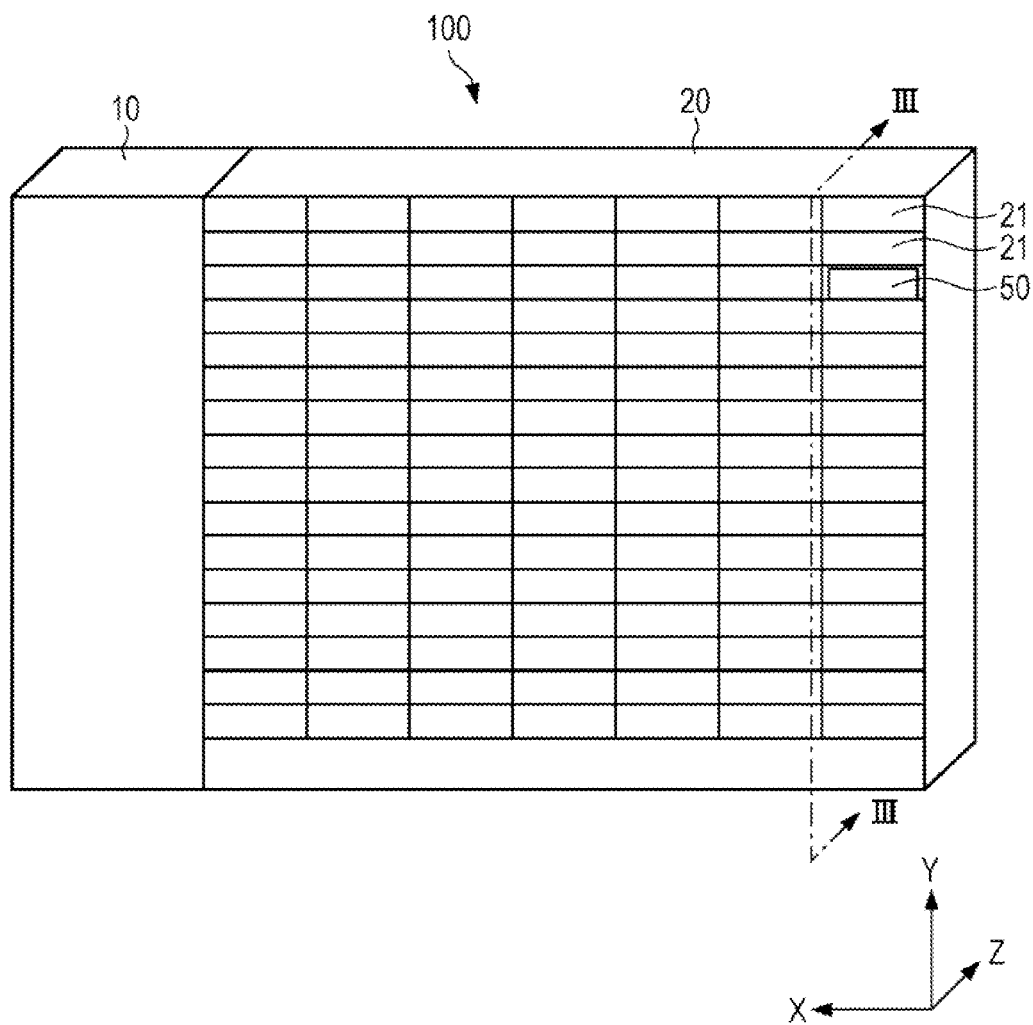
FIG. 2 is a diagram illustrating an example of a library system according to a second embodiment.
Figure 3:
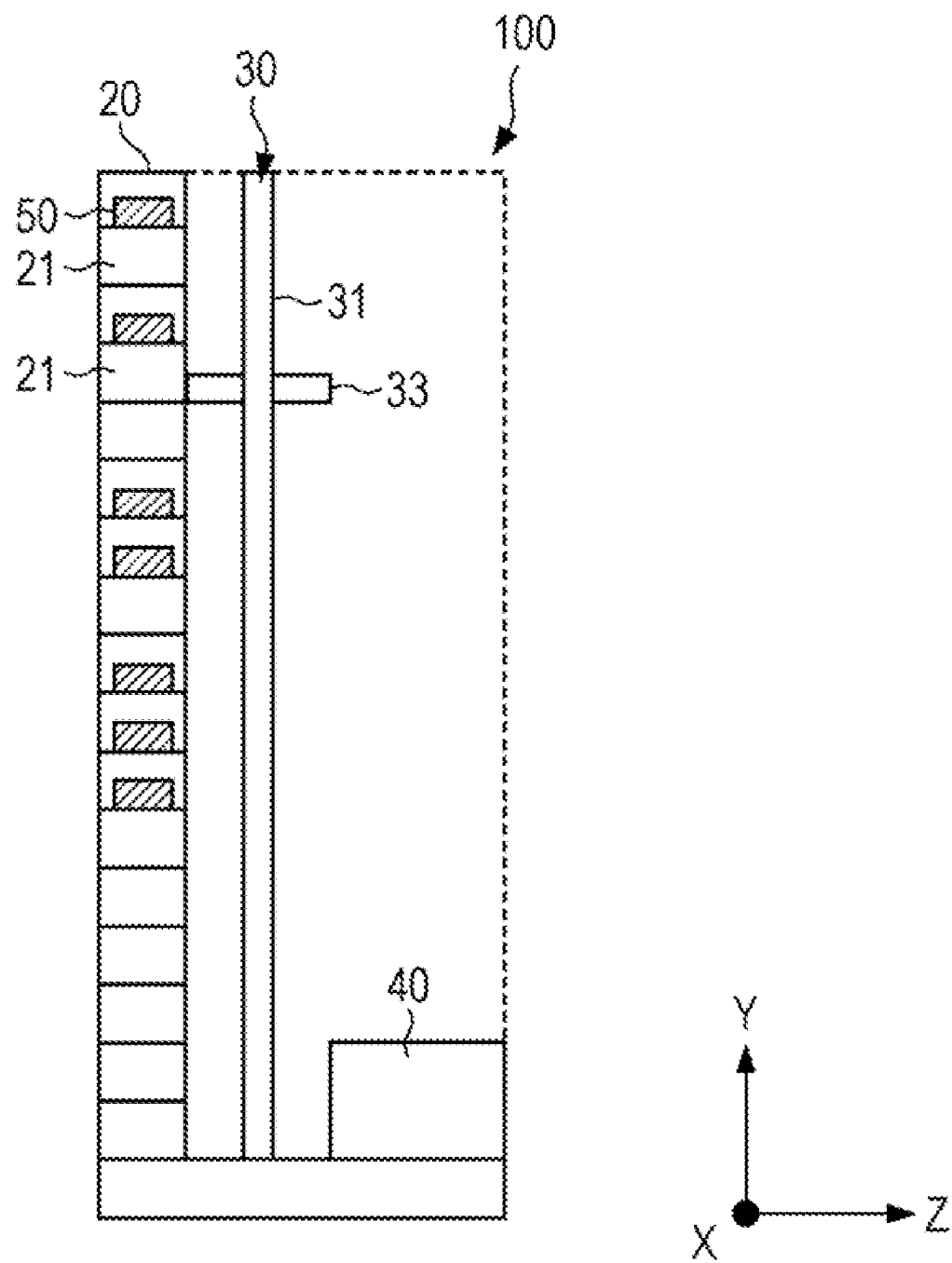
FIG. 3 is a side view of the library system according to the second embodiment taken along the III-III line in FIG. 2.

FIG. 2 is a diagram illustrating an example of a library system according to a second embodiment. FIG. 3 is a side view of the library system according to the second embodiment taken along the III-III line in FIG. 2.

A library system 100 includes a library management device (a control device) 10, a rack 20, a robot (a mount mechanism) 30 and a drive device 40.

The library management device 10 is connected with a host device (not illustrated in the drawing) over a network.

The library management device 10 that receives a request to take out an arbitrary cartridge 50 that contains a storage medium from the host device controls the robot 30 to move to the drive device 40.

The rack 20 includes a plurality of cells 21 which are arranged in a matrix so as to contain the cartridges 50 therein.

Each cell 21 is configured to be opened toward the front side (the front surface side of the rack 20) in the drawing from which the user may be accessible to it and toward the rear side (the rear surface side of the rack 20) in the drawing from which the robot 30 may be accessible to it. One cartridge 50 is contained in one cell 21. That is to say, each cell 21 has openings on the front side and the rear side of the rack 20.

In the example illustrated in FIG. 2, the robot 30 (not illustrated in the drawing) is disposed on the rear surface side of the rack 20.

Incidentally, although in the example illustrated in FIG. 2, one rack 20 is illustrated, the library system 100 may be configured to include the plurality of racks 20.

The user is allowed to insert an arbitrary cartridge 50 directly into an arbitrary cell 21 and to take out an arbitrary cartridge 50 contained in an arbitrary cell 21.

Likewise, the robot 30 is allowed to insert an arbitrary cartridge 50 into an arbitrary cell 21 and to take out an arbitrary cartridge 50 contained in an arbitrary cell 21.

As described above, the library system 100 according to the second embodiment is configured to allow the user to gain access directly to an arbitrary cell 21 in place of provision of a Cartridge Access Station (CAS) that puts an arbitrary cartridge 50 into an arbitrary cell 21 and ejects an arbitrary cartridge 50 from an arbitrary cell 21.

Each cartridge 50 includes a storage medium. For example, still image data, moving image data, private information such as a housekeeping book, health maintenance data and the like, and other various kinds of information are stored in the storage medium.

In addition, a bar code used to identify the kind of each cartridge 50 using a computer is affixed to each cartridge 50. Each cartridge 50 includes a CM (Cartridge Memory) in which information indicating a position at which each piece of data recorded in each cartridge 50 is recorded, the use history of each cartridge 50, an error log and other user areas are recorded. Provision of the CM may make it possible to check up information such as the index, the use status and the like of each cartridge 50 in a short time period with no physical contact with an arbitrary cartridge 50 using an RF interface after an arbitrary cartridge 50 has been loaded onto the drive device 40.

In addition, a ravel indicating information that the user uses in order to identify the kind or the like of each cartridge 50 is affixed to each cartridge 50.

Further, each cartridge 50 includes an engaging part that the robot 30 uses in order to take out each cartridge 50.

FIG. 3 illustrates an example of one column of cells 21 contained in the rack 20. Each shaded block indicates each cartridge 50.

As illustrated in the example in FIG. 3, the robot 30 includes a support 31 that moves on a rail (not illustrated in the drawing) which is disposed in a column direction (an X-axis direction) of the rack 20 and extends in a row direction (a Y-axis direction) of the rack 20, and a hand 33 which is attached to the support 31 to be movable in the Y-axis direction.

The robot 30 operates such that the hand 33 nips an arbitrary cartridge 50 on the basis of an instruction given from the library management device 10 to put the cartridge 50 out of an arbitrary cell 21 and/or to put the cartridge 50 into an arbitrary cell 21.

Specifically, the robot 30 operates to move the support 31 to a row where the cell 21 that contains a cartridge 50 to be taken out is present in accordance with the instruction from the library management device 10.

Then, the robot 30 operates such that the hand 33 moves upward and downward along the support 31 so as to reach the cell 21 so instructed and takes an arbitrary cartridge 50 into/out of one cell 21 using a picker (which will be described later) which is disposed on the leading end of the hand 33.

The robot 30 operates to put an arbitrary cartridge 50 into the rack 20 such that the ravel (hereinafter, referred to as a "ravel surface") affixed to the cartridge 50 is situated on its front surface side and the bar code affixed to the cartridge 50 is situated on the side of the robot 30 (the rear surface side of the cartridge 50). By putting each cartridge 50 into the rack 20 in the above mentioned manner, the user is allowed to readily grasp the contents of each cartridge 50 simply by looking at the ravel on it when the user tries to manually take out the cartridge 50.

The drive device 40 records data in the storage medium included in an arbitrary cartridge 50 which has been carried using the robot 30 or reproduces the data stored in the storage medium.

In the library system 100 so configured as mentioned above, when an arbitrary cartridge 50 including the storage medium into which data is to be recorded or from which data is to be reproduced is designated by the host device, the library management device 10 specifies one cartridge 50 from within the cartridges 50 contained in the respective cells 21. Then, the specified cartridge 50 is nip-held using the hand 33 of the robot 30, is carried to the drive device 40 and is mounted onto the drive device 40.

After data has been recorded into the storage medium in the specified cartridge 50 or reproduced from the storage medium using the drive device 40, the cartridge 50 which is mounted onto the drive device 40 is nip-held using the hand 33 of the robot 30, is taken out of the drive device 40 and is inserted into a designated place in an arbitrary cell 21.

Next, a configuration of the library management device will be described.

Figure 4:
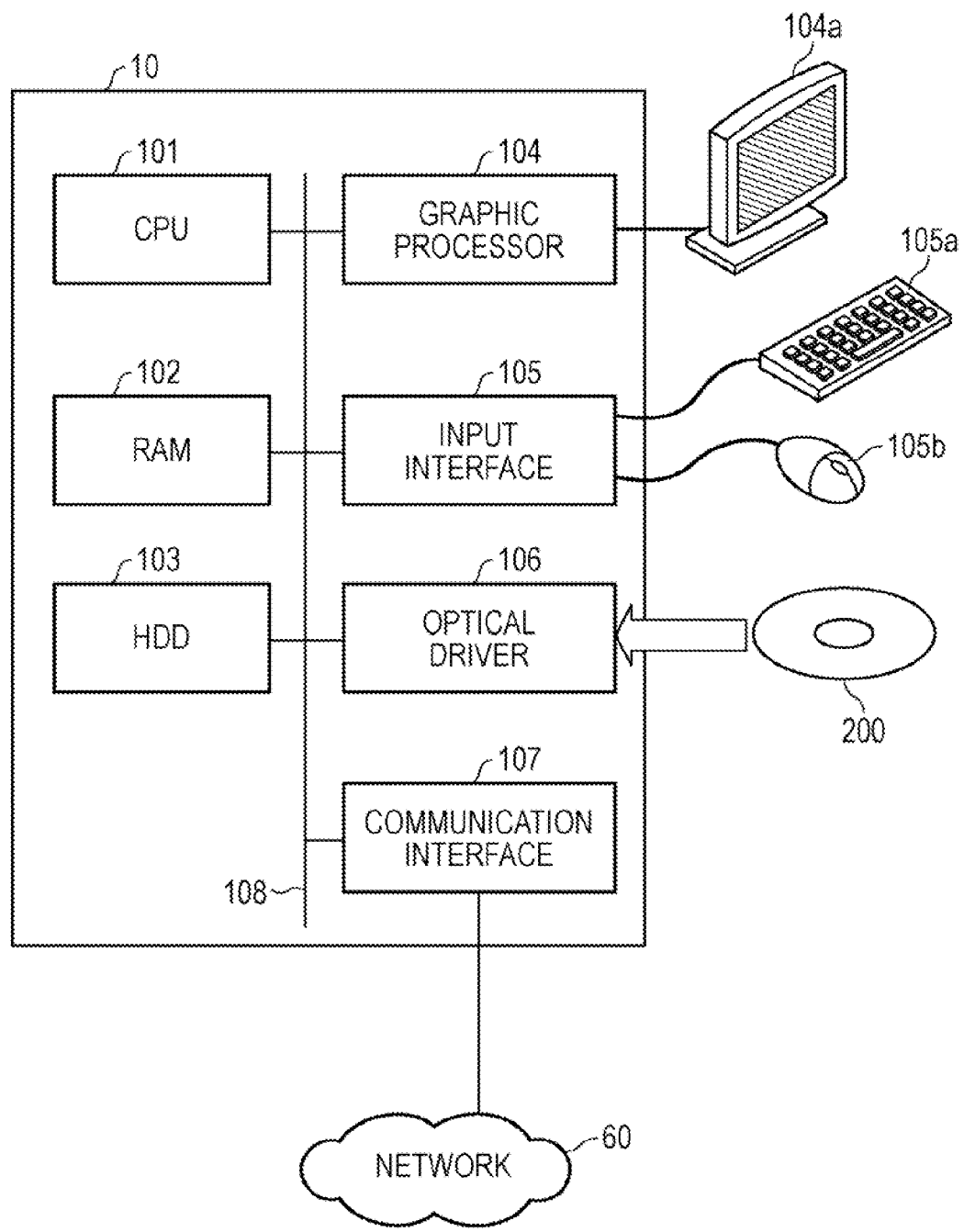
FIG. 4 is a diagram illustrating an example of a hardware configuration of a library management device.

FIG. 4 is a diagram illustrating an example of a hardware configuration of the library management device.

The library management 10 is generally controlled using a CPU (Central Processing Unit) 101. A RAM (Random Access Memory) 102 and a plurality of pieces of peripheral equipment are connected with the CPU 101 via a bus 108.

The RAM 102 is used as a main memory of the library management device 10. At least part of OS (Operating System) programs and application programs that the CPU 101 executes is temporarily stored in the RAM 102. In addition, various kinds of data desirable for execution of processes using the CPU 101 are stored in the RAM 102.

As the plurality of pieces of peripheral equipment which are connected with the bus 108, for example, an HDD (Hard Disk Drive) 103, a graphic processor 104, an input interface 105, an optical driver 106, and a communication interface 107 are included.

The HDD 103 magnetically writes data into a built-in disk and reads data out of the disk. The HDD 103 is used as a secondary memory of the library management device 10. OS programs, application programs and various kinds of data are stored in the HDD 103. Incidentally, a semiconductor memory such as a flash memory or the like may be used as the secondary memory.

A monitor 104a is connected with the graphic processor 104. The graphic processor 104 makes the monitor 104a display an image on its screen in accordance with an instruction from the CPU 101. As examples of the monitor 104a, a display using a CRT (Cathode Ray Tube), a liquid crystal display and the like may be given.

A keyboard 105a and a mouse 105b are connected with the input interface 105. The input interface 105 sends signals which are sent from the keyboard 105a and the mouse 105b to the CPU 101. The mouse 105b is given as an example of a pointing device and other pointing devices may be used in place of the mouse 105b. As examples of other pointing devices, a touch panel, a tablet, a touch pad, a track ball and the like may be given.

The optical driver 106 reads data which is recorded in an optical disc 200 utilizing laser light or the like. The optical disc 200 is a portable recording medium in which data is recorded to be readable by reflection of light. As examples of the optical disc 200, a DVD (Digital Versatile Disc), a DVD-RAM, a CD-ROM (Compact Disc Read Only Memory), a CD-R (Recordable)/RW (Re Writable) and the like may be given.

The communication interface 107 is connected with a network 60. The communication interface 107 sends data to another computer or another piece of communication equipment and receives data from the above mentioned computer or communication equipment over a network 60.

Owing to provision of a hardware configuration as described above, processing functions of the second embodiment may be implemented. Functions which will be described hereinbelow are included in the library management device 10 having a hardware configuration as described above.

FIG. 5 is a block diagram illustrating an example of functions of the library management device.

The library management device 10 includes a main control unit 110, a robot control unit 120, a storage unit 130, and a host interface (I/F) 140.

The main control unit 110 generally controls the operation of the library management device 10. The main control unit 110 controls, for example, so as to display information received from the robot control unit 120 on the monitor 104a and to instruct the robot control unit 120 to perform an operation on the basis of information received from the keyboard 105a or the mouse 105b.

The robot control unit 120 controls the operations of an X-axis motor 32a that drives the robot 30 when the robot 30 is moved in the X-axis direction, a Y-axis motor 32b that drives the robot 30 when the robot 30 is moved in the Y-axis direction, and a Z-axis motor 32c that drives the robot 30 when the robot 30 is moved in a Z-axis direction. The Z-axis direction is a direction through both the openings of the cell.

Specifically, the robot control unit 120 receives an instruction to take out one cartridge 50 which is given from the main control unit 110 and controls movement of the robot 30 to one cell 21 concerned in response to the instruction.

In addition, the robot control unit 120 is connected with the hand control unit 121. The robot control unit 120 sends various instructions to the hand control unit 121. In addition, the robot control unit 120 receives various pieces of information from the hand control unit 121 and sends the received information to the main control unit 110.

The Z-axis motor 32c may be, for example, a servo motor. The Z-axis motor 32c includes a motor main body 41 and an encoder 42 that detects the number of rotations of the motor main body 41. The encoder 42 outputs an encoder signal to the main control unit 110 on the basis of the detected number of rotations the motor main body 41. The encoder signal includes, for example, pulse signals of the number corresponding to the number of rotations of the motor main body 41. The main control unit 110 calculates a distance over which the hand 33 has been moved in the Z-axis direction on the basis of the encoder signal sent from the encoder 42. In the case that the distance over which the hand 33 has been moved in the Z-axis direction is shorter than a distance which is determined in advance, it is judged that the operation of one cartridge 50 by a user conflicts with the operation of another cartridge 50 using the robot 30. Specifically, when a number of pulses in the encoder signal does not increase even though a current value of the motor main body 41 increases, it may be judged that the operation of one cartridge 50.

That is, in the above mentioned situation, in the case that while the user is manually inserting one cartridge 50 into an arbitrary cell 21, the hand 33 also tries to insert another cartridge 50 into that cell 21, an inserting operation performed using the hand 33 is hindered by an inserting operation performed by the user and hence it may become difficult for the hand 33 to insert the cartridge 50 into that cell 21 over a distance which is determined in advance. Likewise, in the case that while the user is manually drawing one cartridge 50 out of an arbitrary cell 21, the hand 33 also tries to draw that cartridge 50 out of that cell 21, a drawing-out operation performed using the hand 33 is hindered by a drawing-out operation performed by the user and it may become difficult for the hand 33 to draw the cartridge 50 out of that cell 21 over a distance which is determined in advance.

Thus, conflict which would occur in the operations of cartridges 50 between the user and the hand 33 may be readily detected by comparing a distance over which the hand 33 has been moved with the distance which is determined in advance. Incidentally, a distance over which the hand 33 is moved in the Z-axis direction and which is desirable when the hand 33 takes an arbitrary cartridge 50 out of an arbitrary cell 21 and a distance over which the hand 33 is moved in the Z-axis direction and which is desirable when the hand 33 inserts an arbitrary cartridge 50 into an arbitrary cell 21 are stored in advance in the storage unit 130. Thus, the main control unit 110 judges whether conflict occurs with reference to data stored in the storage unit 130.

In this embodiment, conflict is detected by comparing the distance over which the hand 33 has been moved with the distance which is determined in advance. However, conflict may be detected by comparing the number of rotations the motor main body 41 with the number which is determined in advance. In this case, the number which is determined in advance is stored in the storage unit 130 in advance. Thus, the main control unit 110 also judges whether conflict occurs with reverence to data stored in the storage unit 130.

The hand control unit 121 is connected with the hand 33.

The hand 33 includes a P (picker) motor 33a, a bar code reader 33b, and a CM (cartridge memory) reader 33c.

The hand control unit 121 drives the P motor 33a in accordance with a drive instruction given from the robot control unit 120. Owing to the above mentioned operation, the hand 33 is allowed to nip an arbitrary cartridge 50 or to release the nipped cartridge 50.

In addition, the hand control unit 121 operates the bar code reader 33b and the CM reader 33c in accordance with a read instruction given from the robot control unit 120. Then, the hand control unit 121 sends bar code information that the bar code reader 33b has read and CM information that the CM reader 33c has read to the robot control unit 120.

For example, in the case that the robot 30 has received an instruction to read the bar code affixed to an arbitrary cartridge 50 from the hand control unit 121, the bar code is read using the bar code reader 33b. The robot 30 sends the read bar code information to the hand control unit 121. As a result, the library management device 10 is allowed to identify that cartridge 50 on the basis of the information which has been read using the bar code reader 33b.

Information indicating, for example, the kind of each cartridge 50 in correspondence with the position where each cartridge 50 is contained is stored in the storage unit 130. The information is collected, for example, by a method of controlling the robot 30 using the main control unit 110 to scan all the cells 21 in the rack 20 thereby to make the CM reader 33c read the CM information of each cartridge 50 or the like.

The host interface 140 is connected with a host device 300 over a network.

Incidentally, the main control unit 110, the robot control unit 120, the hand control unit 121, and the host interface 140 may be implemented using functions that the CPU 101 includes. In addition, the storage unit 130 may be implemented using one area in the RAM 102.

Next, the structure of each cell 21 will be described.

Figure 6A:
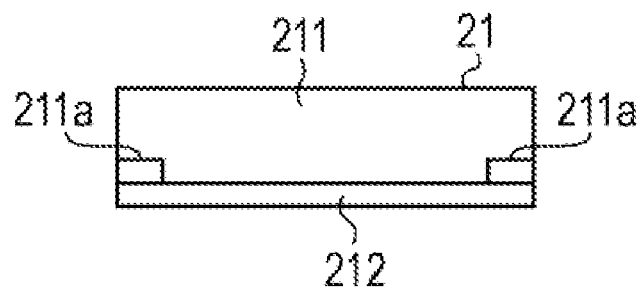
FIG. 6A is a diagram illustrating one example of the structure of a cell.
Figure 6B:
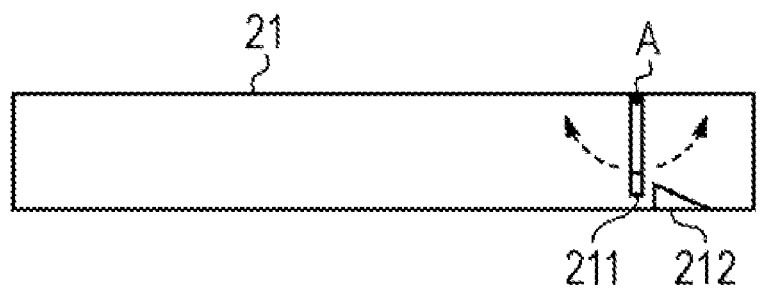
FIG. 6B is a diagram illustrating another example of the structure of the cell.
Figure 6C:
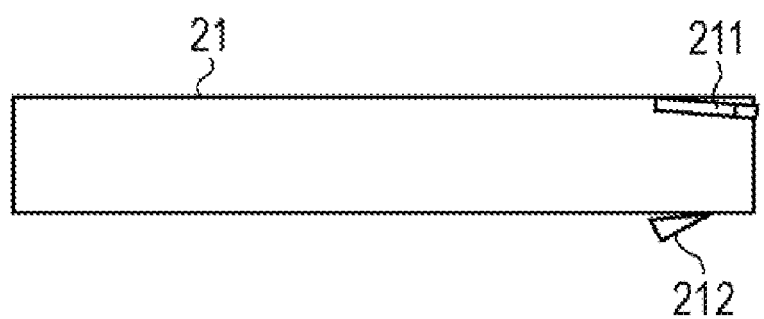
FIG. 6C is a diagram illustrating a further example of the structure of the cell.

FIG. 6A to FIG. 6C are diagrams illustrating examples of the structure of each cell 21.

FIG. 6A is a diagram (a front view) of each cell 21 viewed from its front surface side toward its rear surface side.

A door 211 is attached to the cell 21.

Intrusion of dust and dirt into the library system 100 may be reduced by attaching the door 211 to each cell 21. Thus, failures of the robot 30 may be reduced.

In addition, through-holes 211a through which the picker of the hand 33 passes are formed at two positions in the door 211. In the case that the hand 33 tries to take out an arbitrary cartridge 50 contained in an arbitrary cell 21, the picker of the hand 33 passes through the through-holes 211a. Incidentally, a method of taking out an arbitrary cartridge 50 will be described later.

In a state in which any cartridge 50 is not inserted into an arbitrary cell 21, the user is allowed to visually confirm the front surface of the door 211 of the cell 21.

FIG. 6B is a diagram of each cell 21 viewed from its side surface.

The door 211 rotates about a fulcrum A. The rotation of the door 211 may be controlled using the main control unit 110. In addition, a stopper (a lock mechanism) 212 for restricting the rotation of the door 211 toward the rear surface side of the cell 21 is disposed on the rear surface side of the door 211.

The stopper 212 may be situated at a position (an engagement position) where the stopper 212 engages with the door 211 and at a position (a release position) where the stopper 212 does not engage with the door 211 under the control of the main control unit 110.

In the case that the stopper 212 is situated at the engagement position, when the user inserts an arbitrary cartridge 50 into an arbitrary cell 21 from its front surface side, the cartridge 50 may be prevented from falling down to the rear surface side of the cell 21.

In the case that the stopper 212 is situated at the release position as illustrated in the example in FIG. 6C, the rotation of the door 211 toward the rear surface side of the cell 21 is allowed.

Owing to provision of the door 211 and the stopper 212, contact of the user with the robot 30 may be reduced to prevent the user from being injured.

Next, reading of data stored in a CM (cartridge memory) 50a will be described.

FIG. 7A and FIG. 7B are diagrams illustrating examples of reading of data stored in the CM 50a.

The CM 50a is in the form of a plate and is disposed on an end surface (a ravel surface) 50b of each cartridge 50 to which the ravel is affixed at an inclination angle of 45° viewed from its side surface. As a result, data reading from both of the side of the end surface 50b and the lower surface side of the cartridge 50 is allowed.

For example, as an example in which the data stored in the CM 50a is read from the side of the end surface 50b, a case in which the data is read using the CM reader 33c attached to the robot 30 as illustrated in the example in FIG. 7A may be given.

In addition, as an example in which the data stored in the CM 50a is read from the lower surface side of each cartridge 50, a case in which the data is read using the CM reader 53 which is provided on each cell 21 corresponding to a position at which the CM 50a is situated when an arbitrary cartridge 50 has been put into an arbitrary cell 21 may be given.

Incidentally, as illustrated in the examples in FIG. 7A and FIG. 7B, recessed parts 51 with which the picker of the hand 33 engages are formed in the both side parts of each cartridge 50.

Next, insertion of an arbitrary cartridge 50 into an arbitrary cell 21 will be described.

FIG. 8A to FIG. 8C are diagrams illustrating examples of a manner of inserting an arbitrary cartridge 50 into an arbitrary cell 21.

First, operations of respective parts performed when an arbitrary cartridge 50 is inserted into an arbitrary cell 21 from the front surface side of the cell 21 will be described.

As the user inserts an arbitrary cartridge 50 into an arbitrary cell 21 from the front surface side (see the examples in FIG. 8A and FIG. 8B), the end surface 50b of the cartridge 50 comes into abutment against the door 211 at a position where the entire of the cartridge 50 has been inserted into the cell 21. When the cartridge 50 is pushed into the cell 21 toward its rear surface side in the above mentioned state, the stopper 212 comes into abutment against the door 211. As a result, further movement of the cartridge 50 toward the rear surface side of the cell 21 is restricted (see the example in FIG. 8C).

Next, a manner of taking out an arbitrary cartridge 50 from the rear surface side of an arbitrary cell 21 using the robot 30 will be described with reference to FIG. 8D to FIG. 8F.

The main control unit 110 refers to the information stored in the storage unit 130 and specifies one cell 21 in which a cartridge 50 to be taken out using the robot 30 is disposed on the basis of the information indicating the kinds of the respective cartridges 50 in correspondence with the positions where the respective cartridges 50 are contained.

Then, the main control unit 110 controls to move the stopper 212 of the specified cell 21 to the release position (see the example in FIG. 8D). Then, the robot 30 opens the door 211, draws the cartridge 50 out of the cell 21 and takes the cartridge 50 out of the cell 21 (see the example in FIG. 8E) under the control of the main control unit 110. Incidentally, a method of drawing out an arbitrary cartridge will be described later.

Then, after the cartridge 50 has been entirely drawn out of the cell 21, the door 211 goes back to its original position. The main control unit 110 confirms that the cartridge has been drawn out of the cell 21 using the robot 30 with reference to position sensor information that the robot 30 retains and then returns the stopper 212 to the engagement position (see the example in FIG. 8F).

Next, a direction in which the robot 30 draws an arbitrary cartridge 50 out of an arbitrary cell 21 will be described.

FIG. 9A to FIG. 9D are diagrams illustrating examples of the method of drawing an arbitrary cartridge 50 out of an arbitrary cell 21 using the robot 30.

As illustrated in the example in FIG. 9A, protruded pickers 33d that engage with the recessed parts 51 in each cartridge 50 are disposed on the both end parts of the hand 33.

The hand 33 is configured to change its width (the length in a transversal direction in FIG. 9).

FIG. 9A illustrates a state in which the hand 33 is widened to have a width W1.

In the case that the robot 30 draws an arbitrary cartridge 50 out of an arbitrary cell 21, first, the robot 30 makes the hand 33 draw near the cartridge 50 and inserts the hand 33 into the cell 21 through the through-holes 211a.

Then, as illustrated in the example in FIG. 9B, the robot 30 makes the pickers 33d position in the recessed parts 51 in the cartridge 50.

Then, as illustrated in the example in FIG. 9C, the pickers 33d are inserted into the recessed parts 51 while changing the width W of the hand 33 so as to nip-hold the cartridge 50 using the hand 33. FIG. 9C illustrates a state in which the hand is narrowed to have a width W2 which is narrower than the width W1.

Then, as illustrated in the example in FIG. 9D, the hand 33 is moved in a direction going away from the cell 21 in a state in which the hand 33 keeps nip-holding the cartridge 50. As a result, the door 211 is pushed by the cartridge 50 and is opened toward the rear surface side of the cell 21 and the cartridge 50 is drawn out of the cell 21.

In addition, as another method of drawing an arbitrary cartridge 50 out of an arbitrary cell 21 using the robot 30, a method in which a second hand mechanism for opening the door 211 is provided in addition to the hand 33 and an arbitrary cartridge 50 is drawn out of an arbitrary cell 21 using the hand 33 simultaneously with opening of the door 211 using the second hand mechanism may be given by way of example.

Next, a manner of inserting an arbitrary cartridge 50 into an arbitrary cell 21 using the robot 30 will be described.

FIG. 10A to FIG. 10D are diagrams illustrating examples of a manner of inserting an arbitrary cartridge 50 into an arbitrary cell 21 using the robot 30.

The main control unit 110 specifies an arbitrary cell 21 into which an arbitrary cartridge 50 is to be inserted using the robot 30.

Then, the main control unit 110 controls to move the stopper 212 of the specified cell 21 from the engagement position to the release position (see the examples in FIG. 10A and FIG. 10B). Then, the main control unit 110 controls to move the hand 33 which is in a state in which it nip-holds the cartridge 50 to the specified cell 21 and to make the hand 33 insert the cartridge 50 into the cell 21. When the cartridge 50 comes into abutment against the door 211, the door 211 rotates toward the front surface side of the cell 21. As a result, the cartridge 50 is allowed to move toward the front surface side of the cell 21 (see the example in FIG. 10C).

Then, the end surface 50c of the cartridge 50 is inserted to the depth of the leading end of the cell 21 and when the hand 33 is drawn out of the cell 21, the door 211 goes back to its original position. The main control unit 110 confirms that the hand 33 has been drawn out of the cell 21 and returns the stopper 212 to the engagement position (see the example in FIG. 10D).

In the case that the user intends to take out an arbitrary cartridge 50 which is disposed in an arbitrary cell 21, the user is allowed to take out the cartridge 50 as it is (see an example in FIG. 10E).

Incidentally, such a situation (conflict in access to the cartridges 50) may sometimes occur that the user and the robot 30 try to take out the cartridges 50 which are disposed in one cell 21 simultaneously.

In the above mentioned case, conflict is avoided by performing processes as follows.

Figure 11:
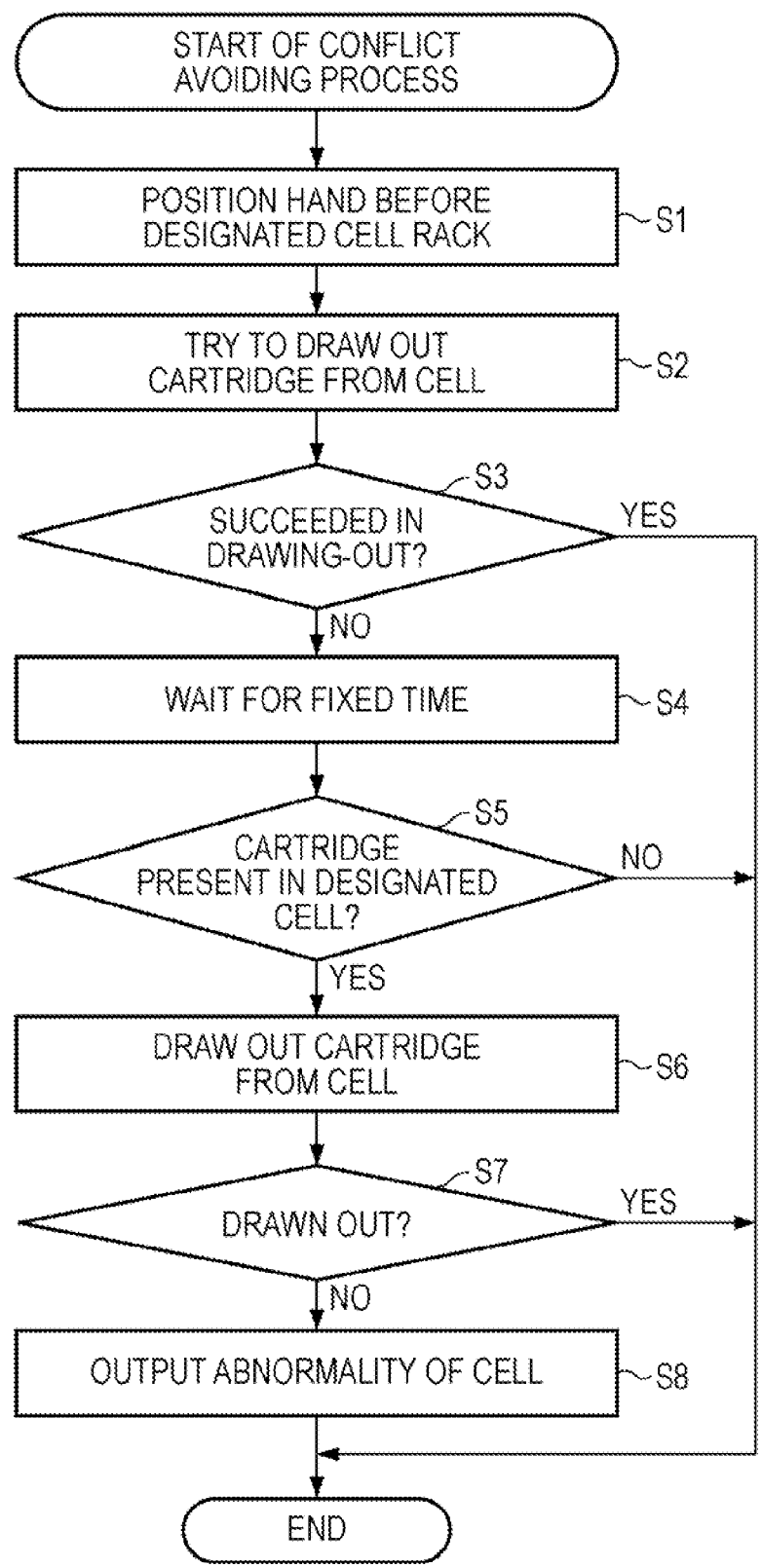
FIG. 11 is a diagram illustrating an example of a flowchart of a conflict avoiding process to be executed in taking cartridges out of an arbitrary cell.

FIG. 11 is a diagram illustrating an example of a flowchart of a conflict avoiding process executed in taking out the cartridges 50.

[Step S1]

The robot control unit 120 controls the robot 30 such that its hand 33 is situated at the position of an instructed cell 21 (which has been instructed to draw a cartridge 50 out of it) in accordance with an instruction from the main control unit 110. Then, the process proceeds to step S2.

[Step S2]

The robot control unit 120 sends an instruction to the hand control unit 121 to try to draw the cartridge 50 out of the instructed cell 21 using the hand 33. Then, the process proceeds to step S3.

[Step S3]

The robot control unit 120 judges whether the robot 30 has succeeded in drawing out the cartridge 50. Judgment is made, for example, by detecting the value of a torque sensor of the hand 33. In the case that the robot control unit 120 judges that drawing-out of the cartridge 50 has been successfully performed (Yes at step S3), the robot control unit 120 decides that conflict does not occur and terminates execution of the process illustrated in FIG. 11. On the other hand, in the case that the robot control unit 120 judges that the robot 30 has failed at drawing out the cartridge 50 (No at step S3), the process proceeds to step S4.

Incidentally, although in the second embodiment, it is judged that the cause for a failure in drawing out the cartridge 50 lies in occurrence of conflict and execution of the process has been terminated, judgment is not limited to the above. That is, another criterion may be prepared and whether the cause for a failure in drawing out the cartridge 50 lies in occurrence of conflict or another factor may be judged on the basis of the criterion.

[Step S4]

The robot control unit 120 controls the hand 33 to stop in the front of the instructed cell 21 and keeps the hand 33 waiting for a fixed time period. Owing to the above mentioned operation, it may become possible to avoid conflict by giving priority to the user in drawing out an arbitrary cartridge 50. After the fixed time period has elapsed, the process proceeds to step S5.

[Step S5]

The robot control unit 120 judges whether a cartridge 50 is present in the instructed cell 21. Judgment may be made, for example, on the basis of a result of detection performed using the CM reader 33c. In the case that any cartridge 50 is not present in the instructed cell 21 (No at step S5), the robot control unit 120 judges that the cartridge 50 has been drawn out of the cell 21 by the user when it has kept the hand 33 from drawing out the cartridge 50 at step S4 and terminates execution of the process of avoiding conflict to be executed in taking out the cartridges 50. On the other hand, in the case that it is judged that a cartridge 50 is present in the instructed cell 21 (Yes at step S5), the process proceeds to step S6.

[Step S6]

The hand 33 tries to draw the cartridge 50 out of the instructed cell 21 in accordance with an instruction given from the robot control unit 120 to the hand control unit 121. Then, the process proceeds to step S7.

[Step S7]

The robot control unit 120 judges whether the cartridge 50 has been successfully drawn out of the instructed cell 21. In the case that it is judged that drawing-out of the cartridge 50 has been successfully performed (Yes at step S7), the robot control unit 120 decides that conflict does not occur and terminates execution of the conflict avoiding process to be executed in taking out the cartridges 50. On the other hand, in the case that the robot control unit 120 judges that the robot 30 has failed at drawing out the cartridge 50 (No at step S7), the process proceeds to step S8.

[Step S8]

The robot control unit 120 decides that abnormality has occurred in the instructed cell 21 and sends the main control unit 110 a notification that abnormality has occurred. Then, execution of the conflict avoiding process to be executed in taking out the cartridges 50 is terminated. The main control unit which has received the notification makes the monitor 104a display a screen indicating that abnormality has occurred.

Explanation of the conflict avoiding process to be executed in taking out the cartridges 50 has been concluded as mentioned above.

Incidentally, in the second embodiment, in the case that execution of drawing-out of the cartridge 50 from the instructed cell 21 has been tried two times and has ended in failure two times, it is judged that abnormality has occurred. However, the number of times is not limited to two and execution of drawing-out of the cartridge 50 may be tried three or more times.

Next, a management information changing process will be described.

The management information changing process is executed using the library management device 10 every time one cartridge 50 is taken out of the drive device 40.

Figure 12:
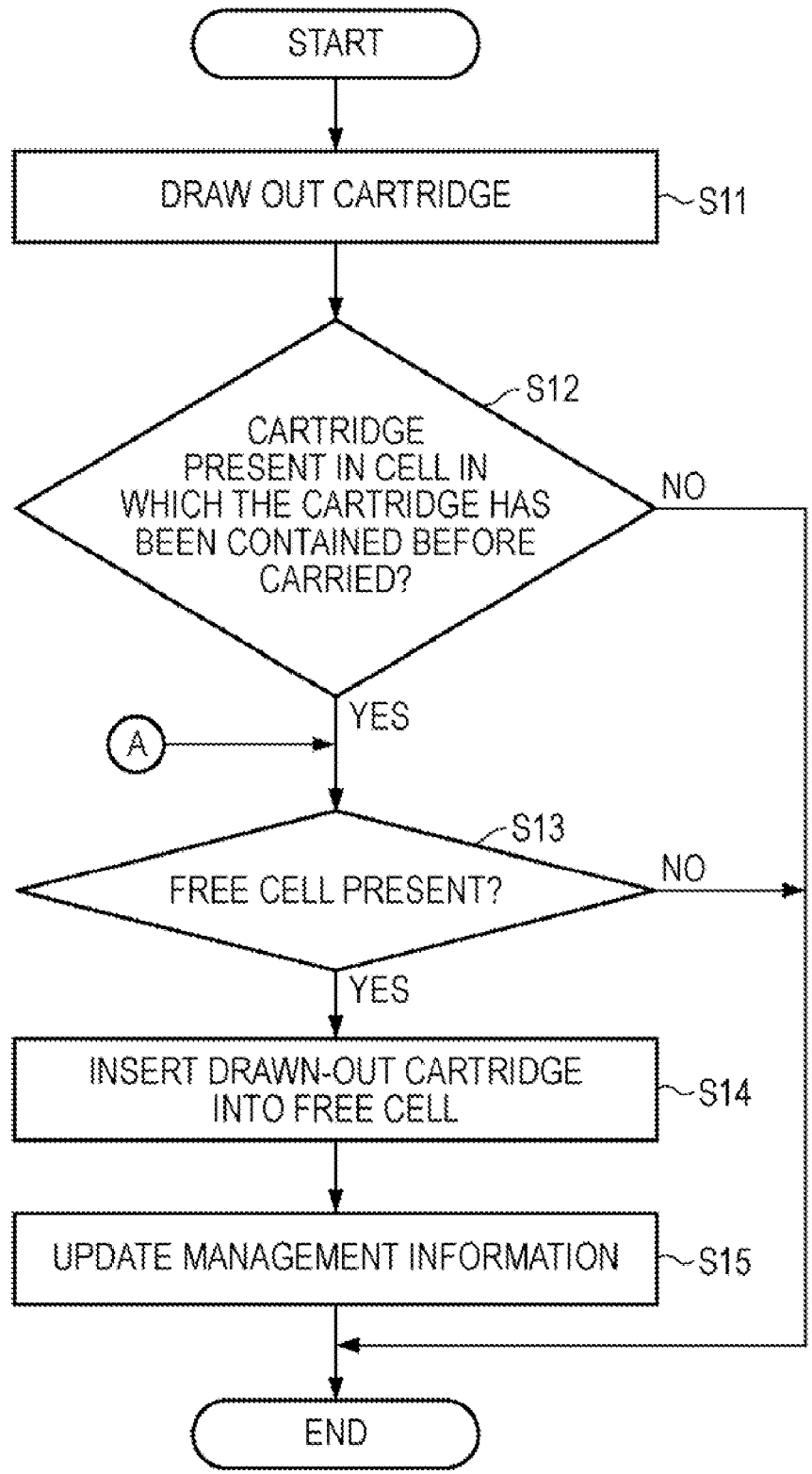
FIG. 12 is a diagram illustrating an example of a flowchart of a management information changing process.

FIG. 12 is a diagram illustrating an example of a flowchart of a management information changing process.

[Step S11]

The main control unit 110 controls the robot to draw one cartridge 50 out of the drive device 40. Then, the process proceeds to step S12.

[Step S12]

The main control unit 110 judges whether another cartridge 50 is present in an arbitrary cell 21 in which the cartridge 50 which has been drawn out of the drive device 40 has been ever contained before it is carried to the drive device 40. In the case that another cartridge 50 is not present in the cell 21 (No at step S12), the main control unit 110 terminates execution of the management information changing process. On the other hand, in the case it is judged that another cartridge 50 is present in the cell 21 (Yes at step S12), the process proceeds to step S13.

[Step S13]

The main control unit 110 judges whether a cell 21 containing no cartridge is present in the rack. In the case that it is judged that the cell 21 containing no cartridge is present in the rack (Yes at step S13), the process proceeds to step S14. On the other hand, in the case that the cell 21 containing no cartridge is not present in the rack (No at step S13), execution of the process illustrated in FIG. 12 is terminated.

[Step S14]

The main control unit 110 instructs the robot control unit 120 to insert the cartridge 50 which has been drawn out of the drive device 40 into the cell 21 containing no cartridge. Then, the process proceeds to step S15.

[Step S15]

The main control unit 110 updates management information. Specifically, the main control unit 110 reads the bar code of the cartridge 50 which has been drawn out of the drive device 40 and rewrites the information which is stored in the storage unit 130 in a state in which the kinds of the cartridges 50 are indicated in correspondence with the positions where the cartridges 50 are contained on the basis of the information in the bar code so read. Then, the main control unit 110 makes the monitor 104a display a screen indicating that the position where the cartridge 50 is contained has been changed. By displaying the above mentioned screen, the main control unit 110 informs the user of change of the position where the cartridge 50 is contained. Then, the main control unit 110 terminates execution of the management information changing process.

The management information changing process has been described as mentioned above.

Next, a conflict avoiding process to be executed in inserting the cartridges 50 into an arbitrary cell will be described.

This process is executed using the library management device 10 in the case that both the user and the robot try to insert cartridges 50 into one cell 21.

Figure 13:
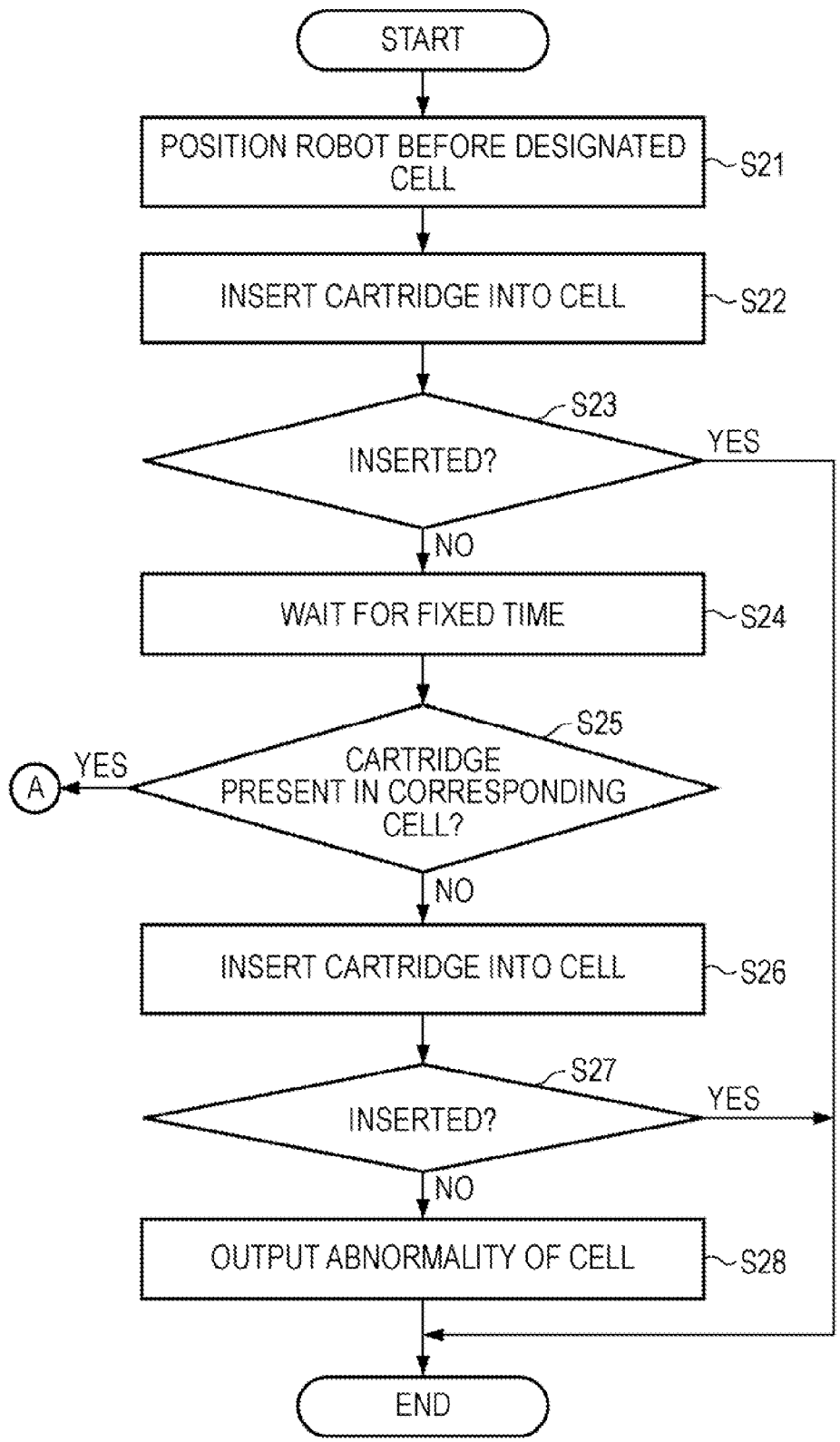
FIG. 13 is a diagram illustrating an example of a flowchart of a conflict avoiding process to be executed in inserting cartridges into an arbitrary cell.

FIG. 13 is a diagram illustrating an example of a flowchart of the conflict avoiding process to be executed in inserting the cartridges 50.

[Step S21]

The main control unit 110 which has received an instruction to draw a cartridge 50 out of the drive device 40 and to insert the drawn-out cartridge 50 into a predetermined cell 21 from the host device 300 instructs the robot 30 to draw the cartridge 50 out of the drive device 40.

Then, the main control unit 110 controls to situate the robot 30 that holds the cartridge 50 which has been drawn out of the drive device 40 in the front of a cell 21 which has been instructed from the host device 300 so as to insert the cartridge 50 into it. Then, the process proceeds to step S22.

[Step S22]

The main control unit 110 controls the robot 30 so as to try to insert the cartridge 50 into the cell 21 so instructed from the host device 300 so as to insert the cartridge 50 into it. Then, the process proceeds to step S23.

[Step S23]

The main control unit 110 judges whether insertion of the cartridge 50 into the cell 21 so instructed from the host device 300 has been successfully performed. When cartridge insertion has been successfully performed (Yes at step S23), execution of the conflict avoiding process to be executed in inserting the cartridges 50 is terminated. On the other hand, when cartridge insertion has not been successfully performed (No at step S23), the process proceeds to step S24.

[Step S24]

In the case that insertion of the cartridge 50 into the cell 21 has not been successfully performed, the robot control unit 120 keeps the robot 30 waiting for a fixed time period. Owing to the above mentioned operation, conflict which would occur in the case that the user tries again to insert an arbitrary cartridge 50 into that cell 21 while the robot control unit 120 is keeping the robot 30 waiting may be avoided. Then, the process proceeds to step S25.

[Step S25]

The main control unit 110 judges whether a cartridge 50 is present in the instructed cell 21 (which has been instructed from the host device 300 so as to insert the cartridge 50 into it). In the case that the cartridge 50 is present in the instructed cell 21 (Yes at step S25), the processes at step S13 and succeeding steps of the management information changing process are executed. On the other hand, when any cartridge 50 is not present in the instructed cell 21 (No at step S25), the process proceeds to step S26.

[Step S26]

The robot control unit 120 controls the robot 30 so as to try to insert a cartridge 50 into the instructed cell 21. Then, the process proceeds to step S27.

[Step S27]

The robot control unit 120 judges whether insertion of the cartridge 50 into the instructed cell 21 has been successfully performed. When cartridge insertion has been successfully performed (Yes at step S27), execution of the conflict avoiding process to be executed in inserting the cartridges 50 is terminated. On the other hand, when cartridge insertion has not been successfully performed (No at step S27), the process proceeds to step S28.

[Step S28]

In the case that insertion of the cartridge 50 into the cell 21 has not been successfully performed, the robot control unit 120 judges that abnormality has occurred in the instructed cell 21 and sends the main control unit 110 a notification that abnormality has occurred. Then, execution of the conflict avoiding process to be executed in inserting the cartridges 50 is terminated. The main control unit 110 that has received the notification controls the monitor 104a to display a screen indicative of occurrence of abnormality.

Explanation of the conflict avoiding process to be executed in inserting the cartridges 50 has been concluded.

As described above, the library management device 10 according to the second embodiment is configured to execute the conflict avoiding process to be executed in taking out the cartridges 50 and the conflict avoiding process to be executed in inserting the cartridges 50. As a result, it may become possible to avoid conflict which may occur between the user and the robot 30 and hence the operability of the user who utilizes the library system 100 may be increased.

In addition, owing to provision of the rack 20 having different access surfaces, one for the user and the other for the robot 30, the user is allowed to freely insert an arbitrary cartridge 50 into an arbitrary cell 21 while the robot 30 is working.

In addition, the access surface for the user is different from that for the robot 30, so that contact between the user and the robot 30 may be avoided and hence the user is allowed to gain access to each cell 21 more safely.

Further, safety may be further increased by disposing the door 211 on each cell 21.

In addition, the user is allowed to manually put an arbitrary cartridge 50 into an arbitrary cell 21, so that the cartridges 50 may be readily put in order, for example, by classifying positions where the cartridges 50 are contained in accordance with applications of the respective cartridges 50. For example, in the case that a series of data is separately stored in the plurality of cartridges 50, data missing and data duplication may be visually grasped by putting the cartridges 50 that hold the series of data in the rack in a mass.

In addition, owing to provision of the rack 20, use of the CAS may be eliminated and hence the operability of the user may be increased.

For example, in a library system including the CAS, in the case that data which is stored in a plurality of cartridges 50 and is of the size which is so large as not to be retained in the CAS at one time is to be backed-up or restored, it may be unavoidable to divide the cartridges 50 to be put into the CAS into groups, or to temporarily stop the operation of the library management device and then to open the door of the rack in which the cartridges 50 are contained to gain access to an arbitrary cell. However, in the library system 100 according to the second embodiment, it may become possible to put the plurality of cartridges 50 into the respective cells 21 without stopping the operation of the library management device 10.

In addition, the user is allowed to gain access to each cartridge 50 from the side opposite to the side on which the robot 30 is disposed with the rack 20 interposed between them and hence each cartridge 50 may be readily put into each cell 21 and put out of each cell 21.

In addition, in the case that the library system 100 is to be commonly used by a plurality of users, for example, the library system 100 may be used in the following manner.

The range of cells used may be determined on a user by user basis or on a section by section basis.

It may be also possible to determine the range of cells used on an application (kind of data) by application basis, or on a date (or year and month) by date basis. As examples of kinds of data, for example, document data, still image data, moving image data, voice data, housekeeping book data, health maintenance data and the like may be given.

<Third Embodiment>

Next, a library system according to a third embodiment will be described.

In the following, different points of the library system according to the third embodiment from those of the library system according to the second embodiment will be described and description of the same points as those in the second embodiment will be omitted.

FIG. 14A to FIG. 14F are diagrams illustrating examples of a cell according to the third embodiment.

Figure 14A:
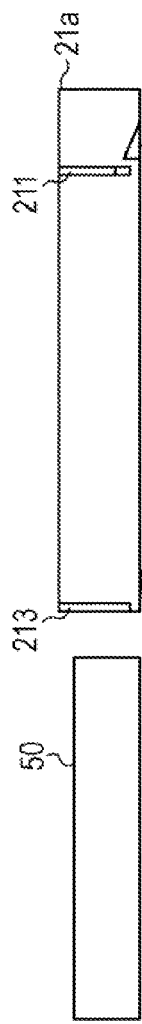
FIG. 14A is a diagram illustrating one example of a cell according to a third embodiment.
Figure 14B:
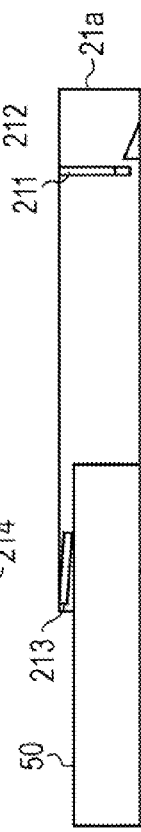
FIG. 14B is a diagram illustrating another example of the cell according to the third embodiment.
Figure 14C:
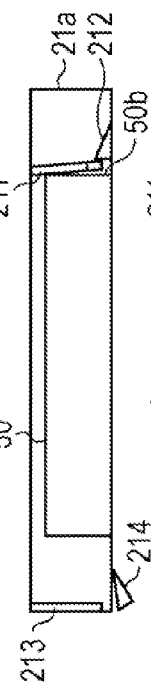
FIG. 14C is a diagram illustrating a further example of the cell according to the third embodiment.

As illustrated in the example in FIG. 14A, a cell 21a according to the third embodiment includes a door 213 disposed on its front surface side, and a stopper 214 for restricting rotation of the door 213 toward its rear surface side.

The door 213 rotates about a fulcrum (not illustrated in the drawing) as in the case of the door 211.

The stopper 214 may be situated at a position (an engagement position) where it engages with the door 213 and a position (a release position) where it does not engage with the door 213.

The transversal length of the cell 21a is made longer than that of each cartridge 50 such that the door 213 may be closed in a state in which each cartridge 50 is contained in each cell 21a.

Next, insertion of an arbitrary cartridge 50 into an arbitrary cell 21a will be described.

First, operations of respective parts performed when an arbitrary cartridge 50 is inserted into an arbitrary cell 21a from the font surface side of the cell 21a will be described.

In inserting an arbitrary cartridge 50 into an arbitrary cell 21a from the front surface side of the cell 21a, the stopper 214 is situated at the release position (see FIG. 14A). When a user inserts the cartridge 50 into the cell 21a from the front surface side of the cell 21a (see FIG. 14B), the door 213 is pushed into the cell 21 toward its rear surface side.

Then, when the entire of the cartridge 50 is positioned within the cell 21a, an end surface 50b of the cartridge 50 comes into abutment against the door 211. The stopper 212 is in abutment against the door 211, so that further movement of the cartridge 50 toward the rear surface side of the cell 21a is restricted. In the above mentioned situation, the door 213 goes back to its original position by gravity (see FIG. 14C).

Next, taking-out of an arbitrary cartridge 50 using the robot 30 will be described.

The main control unit 110 specifies a cell 21a in which a cartridge 50 to be taken out using the robot 30 is disposed on the basis of information in which the kinds of respective cartridges 50 are indicated in correspondence with the positions where the respective cartridges 50 are contained.

Figure 14D:
FIG. 14D is a diagram illustrating a still further example of the cell according to the third embodiment.

Then, the main control unit 110 controls the stopper 212 of the specified cell 21a so as to move to the release position (see FIG. 14D). Simultaneously with controlling the stopper 212 to move to the release position or before controlling the stopper 212 to move to the release position, the main control unit 110 controls the stopper 214 so as to move to the engagement position. Owing to the above mentioned operations, conflict which would occur between the user and the robot 30 may be avoided.

Figure 14E:
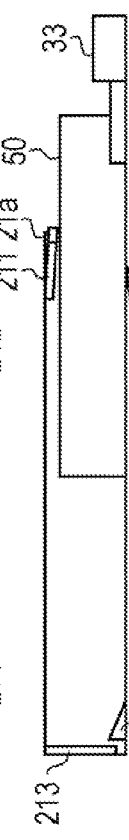
FIG. 14E is a diagram illustrating a still further example of the cell according to the third embodiment.
Figure 14F:
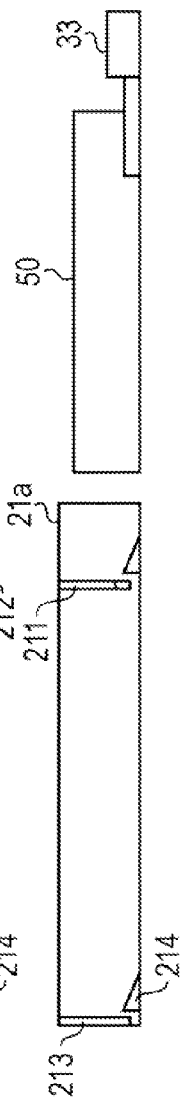
FIG. 14F is a diagram illustrating a still further example of the cell according to the third embodiment.

Then, the robot 30 rotates the door 211 and draws the cartridge 50 out of the cell 21a (see FIG. 14E).

After the cartridge 50 has been drawn out of the cell 21a, the door 211 goes back to its original position by gravity. The main control unit 110 confirms that the cartridge 50 has been drawn out of the cell 21a and then controls the stopper 212 so as to return to the position where it engages with the door 211 (see FIG. 14F).

Incidentally, in the example illustrated in FIG. 14A to FIG. 14F, the main control unit 110 controls such that the user is permitted to open the door 211 to take out an arbitrary cartridge 50 until the robot 30 starts taking out of the cartridge 50. However, a manner of controlling the operations of respective parts is not limited to the above and a controlling operation may be performed such that after the user has inserted an arbitrary cartridge 50 into an arbitrary cell 21a once, taking-out of that cartridge 50 by the user is forbidden (locked).

Next, an example of a method of controlling the doors 211 and 213 will be described in detail.

FIG. 15 is a diagram illustrating an example of a manner of controlling the doors 211 and 213.

A door control table 215 illustrated in FIG. 15 is stored in, for example, the HDD 103 and the main control unit 110 is allowed to read it to be used.

In the door control table 215, as states of access to each cell 21a, four access states, that is, "Before Insertion of Cartridge", "After Insertion of Cartridge", "Access to Cartridge from Robot", and "After Bringing-back of Cartridge to Cell Using Robot" are indicated.

In addition, two control modes are set in the door control table 215. The main control unit 110 is allowed to select one of the above mentioned two control modes. One mode is a mode (a first mode) in which the user is allowed to freely take out a cartridge 50 that the user has put into an arbitrary cell 21a and the other mode is a mode (a second mode) in which the user is not allowed to freely take out a cartridge 50 that the user has put into an arbitrary cell 21a.

Incidentally, in the example of the table illustrated in FIG. 15, "Front Door" indicates the door 211 and "Rear Door" indicates the door 213. "Unlocked" in the column for the front door indicates that the stopper 212 is situated at the release position, and "Locked" in the column for the front door indicates that the stopper 212 is situated at the engagement position. Likewise, "Unlocked" in the column for the rear door indicates that the stopper 214 is situated at the release position, and "Locked" in the column for the rear door indicates that the stopper 214 is situated at the engagement position.

In the first mode, the door 213 is locked only when the robot 30 gains access to an arbitrary cartridge 50. Owing to the above mentioned operation, conflict which would occur in taking out a cartridge 50 may be avoided.

On the other hand, in the second mode, the door 213 is locked when an arbitrary cartridge 50 is inserted into an arbitrary cell 21a. Owing to the above mentioned operation, security of the cartridges 50 may be increased.

According to the library system of the third embodiment, the same effects as those obtained by the library system of the second embodiment may be obtained.

Then, according to the library system of the third embodiment, after an arbitrary cartridge 50 has been inserted into an arbitrary cell 21a, the stopper 214 of the cell into which the cartridge 50 has been inserted is moved to the engagement position to lock the door 213 by setting the mode to the second mode. Thus, the possibility that a third person opens the door without leave to take the cartridge 50 away may be avoided and hence the safety in management of the cartridges 50 may be increased.

In addition, conflict which would occur between the user and the robot 30 may be readily avoided.

<Fourth Embodiment>

Next, a library system according to a fourth embodiment will be described.

In the following, different points of the library system according to the fourth embodiment from those in the library system according to the third embodiment will be described and description of the same parts as those in the third embodiment will be omitted.

FIG. 16 is a diagram illustrating an example of a library system according to the fourth embodiment.

The library system according to the fourth embodiment includes a touch panel 71 and a cartridge ejection part 72.

Figure 17:
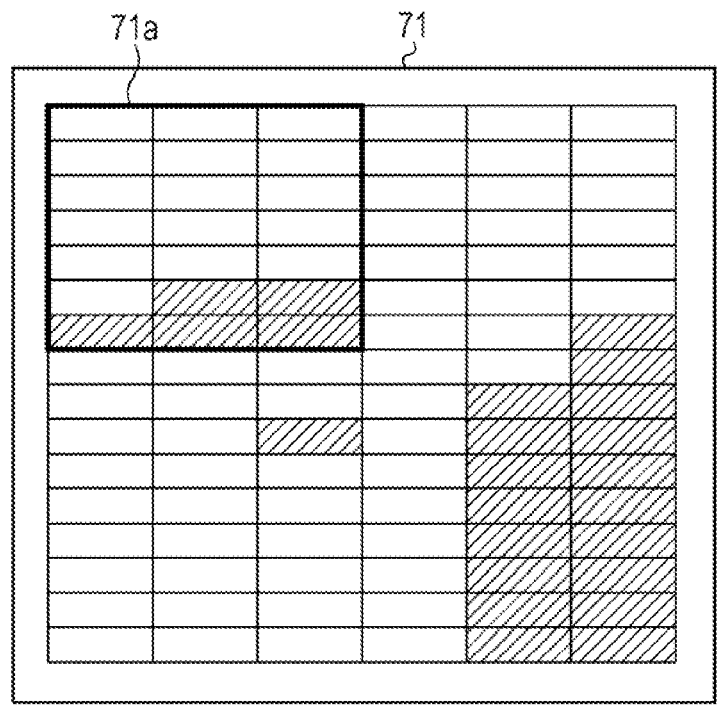
FIG. 17 is a diagram illustrating an example of a display image on a touch panel.

FIG. 17 is a diagram illustrating an example of a display image on the touch panel 71.

On the touch panel 71, an operable area 71a indicating a state in which the cartridges 50 are contained in the respective cells 21a and an area in which the user is allowed to take an arbitrary cartridge 50 into an arbitrary cell 21a and out of an arbitrary cell 21a. In the example illustrated in FIG. 17, a shaded part indicates the area where any cartridge 50 is not contained.

Each grid displayed on the touch panel 71 corresponds to each cell 21a.

The operable area 71a may be configured such that, for example, different areas are allocated to different users or different sections of a company. As an alternative, the operable area 71a may be configured such that an area to be used is determined in accordance with the application of each piece of data or the date (or year and month) of each piece of data.

The user is allowed to change the position where each cartridge 50 is disposed in the operable area 71a by operating the touch panel 71.

Description will be further made returning to the example in FIG. 16.

The cartridge ejection part 72 is a part through which each cartridge 50 is ejected. The cartridge 50 to be ejected may be carried to the cartridge ejection part 72 and then may be taken out of the library system under the operation of the touch panel 71 by the user.

The library system according to the fourth embodiment is configured such that in the case that the user designates an arbitrary cartridge 50 by operating the touch panel 71 or inserts an arbitrary cartridge 50 into an arbitrary cell 21a, a pop-up menu is displayed on the touch panel 71 in response to the above mentioned operation.

Figure 18:
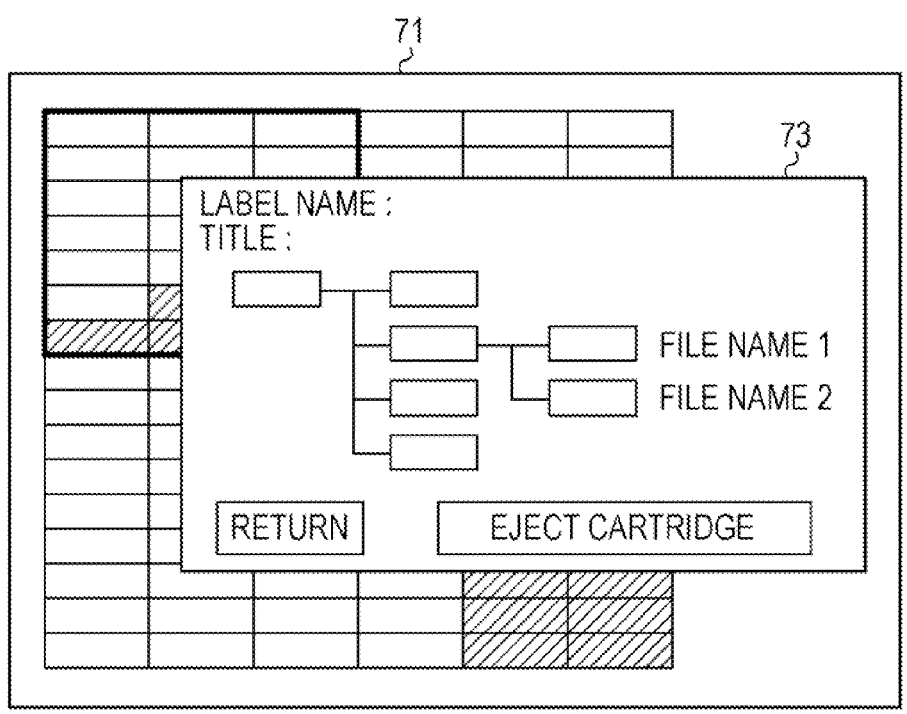
FIG. 18 is a diagram illustrating an example of a pop-up menu.

FIG. 18 is a diagram illustrating an example of a pop-up menu.

The content of an arbitrary cartridge 50 which has been designated under the operation of the touch panel 71 or the directory structure of data stored in an arbitrary cartridge 50 which has been inserted into an arbitrary cell 21a is displayed on a pop-up menu 73.

In the case that the cartridge 50 so inserted is to be taken out of the cell 21a, an instruction to eject the cartridge 50 is sent to the main control unit 110 by selecting "Eject Cartridge" on the pop-up menu 73.

The main control unit 110 specifies the cartridge 50 that stores data on a selected file. Next, the cell 21a that contains the specified cartridge 50 is specified. Then, the hand 33 of the robot 30 is actuated under the instruction of the main control unit 110 to nip-hold the cartridge 50 which is contained in the specified cell 21a. The robot 30 carries the nip-held cartridge 50 to the cartridge ejection part 72.

According to the library system of the fourth embodiment, the same effects as those obtained by the library system according to the third embodiment may be obtained.

In addition, according to the library system of the fourth embodiment, in which cell 21a in the library system a cartridge 50 that a user wishes to obtain is contained may be more readily grasped.

Next, following altered embodiments will be described in addition to the above mentioned first to fourth embodiments.
<Altered Embodiments>

Figure 19A:
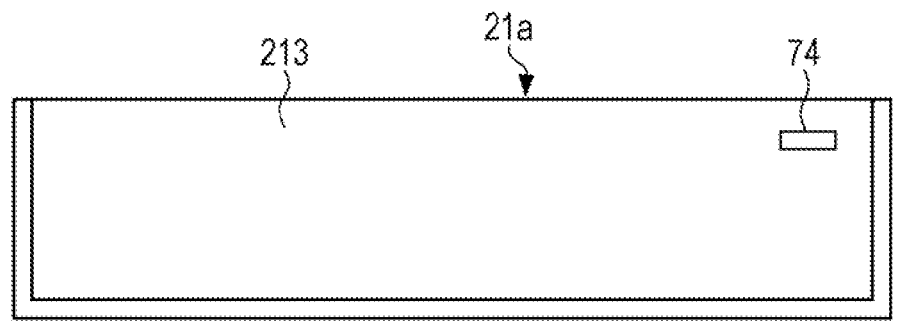
FIG. 19A is a diagram illustrating an example of a library system according to one altered embodiment.
Figure 19B:
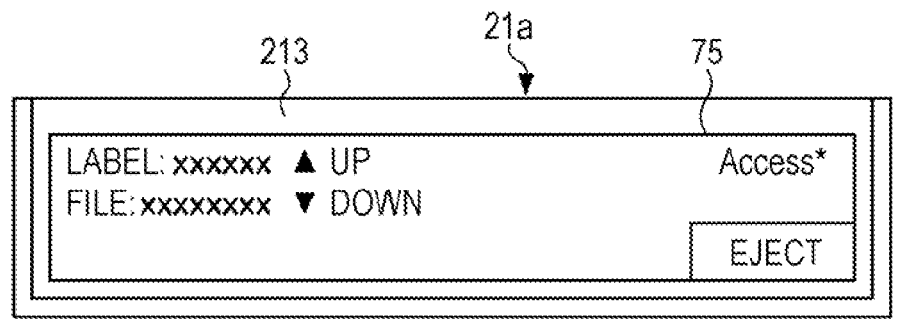
FIG. 19B is a diagram illustrating an example of a library system according to another altered embodiment.
Figure 20:
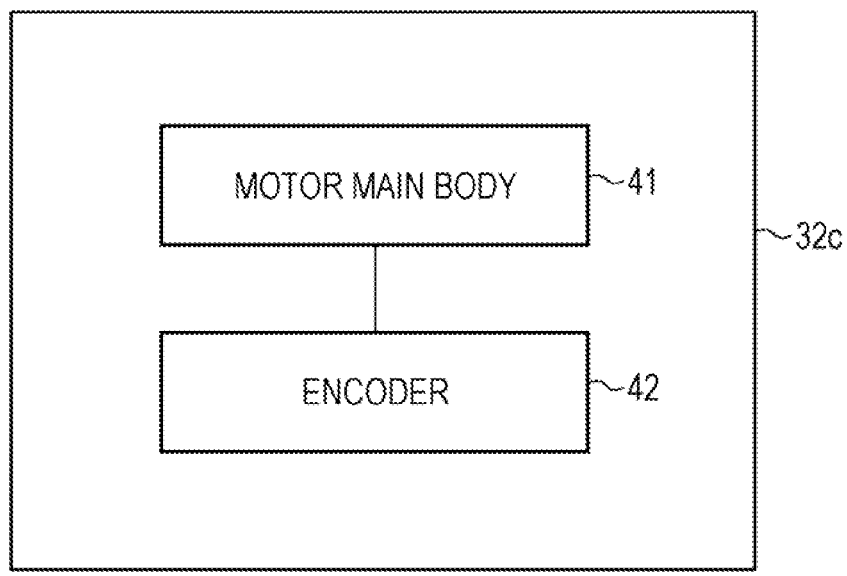
FIG. 20 is a diagram illustrating an example of a configuration of a Z-axis motor illustrated in FIG. 5.

FIG. 19A and FIG. 19B are diagrams illustrating examples of the library system according to altered embodiments.

A display unit that displays various kinds of information may be provided on the door 213 of each cell 21a.

FIG. 19A is a diagram illustrating an example of the library system according to one altered embodiment in which a display unit is provided on the door 213 of each cell 21a.

An LED 74 is an example of the display unit and displays information indicating the presence/absence of the respective cartridges 50 in the respective cells 21a and information indicating that the cell 21a that the user intends to operate is which one.

Specifically, in the case that a cartridge 50 is contained in a cell 21a, the LED 74 of the cell 21a is turned on. In the case that any cartridge 50 is not contained in a cell 21a, the LED 74 of the cell 21a is turned off. In addition, when one cell 21a is selected under the operation of the touch panel 71, the LED 74 of the selected cell (the cell that the user intends to operate) 21a is turned on and off.

FIG. 19B is a diagram illustrating an example of the library system according to another altered embodiment in which a touch panel is provided on the door 213 of each cell 21a.

Information indicating the contents of data in each cartridge 50 which is contained in each cell 21a is displayed on a touch panel 75 in addition to the information indicating the presence/absence of the respective cartridges 50 in the respective cells 21a and the information indicating that the cell 21a that the user intends to operate is which one. In the example illustrated in FIG. 19B, the ravel name and the file name of the data in each cartridge 50 are displayed as examples of the above mentioned information.

In addition, in the case that information other than the above is to be looked at, if the user touches a part on which "UP" or "DOWN" is displayed, the display on the screen will be changed so as to allow the user to look at information other than the above. In addition, if the user touches a part on which "EJECT" is displayed, the main control unit 110 will start execution of an operation of ejecting the cartridge 50 concerned.

Although the control program, the control method and the control device of the invention have been described on the basis of the embodiments illustrated in the drawings, the invention is not limited to the above and configurations of respective units may be replaced by arbitrary configurations having the same functions. In addition, other arbitrary structures and steps may be added to the invention.

In addition, the invention may be a combination of two or more arbitrary configurations (characteristics) included in the above mentioned embodiments.

Incidentally, the above mentioned processing functions may be implemented using a computer. In the above mentioned case, a program in which processing contents of functions that the library management device 10 includes are described is provided. The above mentioned processing functions may be implemented using the computer by executing the above mentioned program using the computer. The program in which the processing contents are described may be recorded in a computer readable storage medium. As examples of the computer readable storage medium, for example, a magnetic recording device, an optical disc, a magnetic-optical recording medium, a semiconductor memory and the like may be given. As examples of the magnetic recording device, for example, a hard disc drive (HDD), a flexible disc (FD), a magnetic tape and the like may be given. As example of the optical disc, for example, a DVD, a DVD-RAM, a CD-ROM, a CD-R/RW and the like may be given. As examples of the magnetic-optical recording medium, for example, an MD and the like may be given.

In the case that a program is to be made commercially available, a portable recording medium, for example, such as a DVD, a CD-ROM or the like in which the program is recorded is marketed. As an alternative, the program may be recorded in a memory of a server computer and may be transferred from the server computer to another computer over a network.

A computer used to execute a library management program stores the program which is, for example, recorded in a portable recording medium or the program which is transferred from a server computer in its memory. Then, the computer reads the program out of its memory to execute processes according to the program. As an alternative, the computer may read a program directly out of a portable recording medium and execute processes according to the program. In addition, every time a program is transferred from a server computer, the computer may execute processes according to the received program each time.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A management apparatus for managing a storage medium, the apparatus comprising:

a rack including a cell to house a storage medium which has a first opening and a second opening;

a robot to insert or eject the storage medium with respect to the cell through the first opening; and a controller to execute a process including:

driving the robot to start inserting or ejecting the storage medium with respect to the cell, detecting a failure in inserting or ejecting the storage medium, the failure is detected when the robot starts inserting the storage medium into the cell when another storage medium is being inserted into the cell through the second opening or when the robot starts ejecting the storage medium from the cell when the storage medium is being ejected from the cell through the second opening, stopping the robot from inserting or ejecting the storage medium for a given time upon detecting the failure, and driving the robot to restart inserting or ejecting the storage medium with respect to the cell after the stopping.

2. The apparatus according to claim 1, wherein the robot includes:

a hand to hold the storage medium, a moving unit to move the hand to insert or eject the storage medium through the first opening, and a detector to detect a moving distance of the hand, wherein the controller detects the failure on a basis of the moving distance of the hand.

3. The apparatus according to claim 1, wherein the robot includes:

a hand to hold the storage medium, a motor to generate rotations to move the hand for a distance corresponding to a number of the rotations to insert or eject the storage medium through the first opening, and a detector to detect the number of the rotations of the motor, wherein the controller detects the failure on a basis of the number of the rotations.

4. A management method of managing a storage medium which is to be inserted or ejected with respect to a cell through a first opening of the cell by a robot hand, the method comprising:

driving the robot hand, by a controller, to start inserting or ejecting the storage medium with respect to the cell, the cell configured to house the storage medium and have a first opening and a second opening;

detecting a failure, by the controller, in inserting or ejecting the storage medium, the failure is detected when the robot hand starts inserting the storage medium into the cell when another storage medium is being inserted into the cell through the second opening of the cell or when the robot hand starts ejecting the storage medium from the cell when the storage medium is being ejected from the cell through the second opening;

stopping the robot hand, by the controller, from inserting or ejecting the storage medium for a given time upon detecting the failure; and driving the robot hand, by the controller, to restart inserting or ejecting the storage medium with respect to the cell after the stopping the robot hand from inserting or ejecting the storage medium for the given time.

5. The method according to claim 4, wherein the driving includes:

moving the robot hand to insert or eject the storage medium through the first opening, and the detecting includes:

detecting a moving distance of the robot hand, and detecting the failure on a basis of the moving distance.

6. The method according to claim 4, wherein the driving includes:

driving a motor to generate rotations to move the robot hand for a distance corresponding to a number of the rotations to insert or eject the storage medium through the first opening, and the detecting includes:

detecting the number of the rotations of the motor, and detecting the failure on a basis of the number of the rotations.

7. A management apparatus comprising:

a rack including a cell to house a storage medium, the cell having a first opening and a second opening;

a robot to insert or eject the storage medium with respect to the cell; and a touch panel display to display a cell indication mark corresponding to the cell housing the storage medium and display a data structure diagram of data stored in the storage medium when the cell indication mark corresponding to the cell housing the storage medium is touched and a discharging indication mark when the cell indication mark corresponding to the cell housing the storage medium is touched, and the robot discharges the storage medium from the cell when the discharging indication mark corresponding to the cell housing the storage medium is touched.

* * * * *